United States Patent
Rimoto

(10) Patent No.: US 6,257,983 B1
(45) Date of Patent: Jul. 10, 2001

(54) COMPUTER READABLE PROGRAM PRODUCT STORING PROGRAM FOR CURSOR DISPLAY IN BALL-PLAYING GAME, SAID PROGRAM, AND CURSOR DISPLAY PROCESSING APPARATUS AND METHOD FOR BALL-PLAYING TYPE GAME

(75) Inventor: Shiyu Rimoto, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/633,150

(22) Filed: Aug. 4, 2000

(30) Foreign Application Priority Data

May 19, 2000 (JP) .................................................. 00-149076

(51) Int. Cl.$^7$ ....................................................... A63F 9/24
(52) U.S. Cl. ........................... 463/38; 463/3; 273/148 B; 345/159
(58) Field of Search .................................. 463/3, 36, 37, 463/38, 39; 273/148 B; 345/159, 156, 157, 161, 167

(56) References Cited

U.S. PATENT DOCUMENTS

| | | | |
|---|---|---|---|
| 5,191,641 | * | 3/1993 | Yamamoto et al. . |
| 5,195,179 | * | 3/1993 | Tokunaga . |
| 5,432,530 | * | 7/1995 | Arita et al. . |
| 5,710,574 | * | 1/1998 | Jaaskelainen, Jr. . |
| 5,764,219 | * | 6/1998 | Rutledge et al. . |
| 5,786,805 | * | 7/1998 | Barry . |
| 5,877,748 | * | 3/1999 | Redlich . |
| 6,052,115 | * | 4/2000 | Gregg et al. . |
| 6,069,614 | * | 5/2000 | Singhal . |
| 6,115,029 | * | 9/2000 | Jaaskelainen et al. . |

FOREIGN PATENT DOCUMENTS 10105328   4/1998  (JP) .

* cited by examiner

*Primary Examiner*—Michael O'Neill
(74) *Attorney, Agent, or Firm*—Greenblum & Bernstein, P.L.C.

(57) ABSTRACT

A computer readable program product stores a program for processing of cursor display, which enables fine adjustment of the cursor position in the strike zone and batting zone, and improves the operability. The state of a joystick is expressed by tilt data (x), and the value of the tilt data is entered into a function Fh(x) to find a displacement from a reference position O of a strike zone to a target position of movement of the cursor. The amount of change of the value of the function Fh(x) when the value of the tilt data changes from 5/6 to 1 is made smaller than the amount of change of the value of the function Fh(x) when the value of the tilt data changes from 0 to 1/6. The amount of change of the target position of movement corresponding to the amount of change of the joystick is made smaller the larger the tilt angle of the joystick. As a result, fine adjustment of the target position of movement is facilitated the larger the tilt angle becomes.

40 Claims, 15 Drawing Sheets

Fig.7
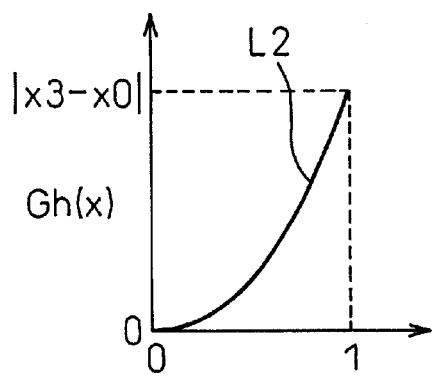
ABSOLUTE VALUE OF
X-AXIAL DIRECTION
TILT DATA
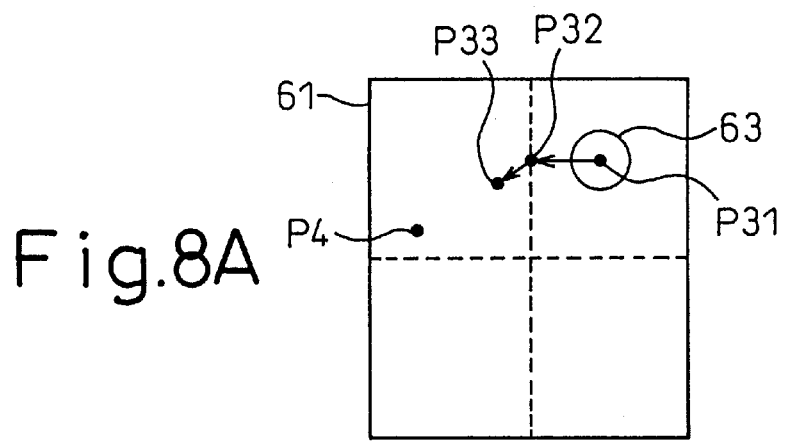
Fig.8A
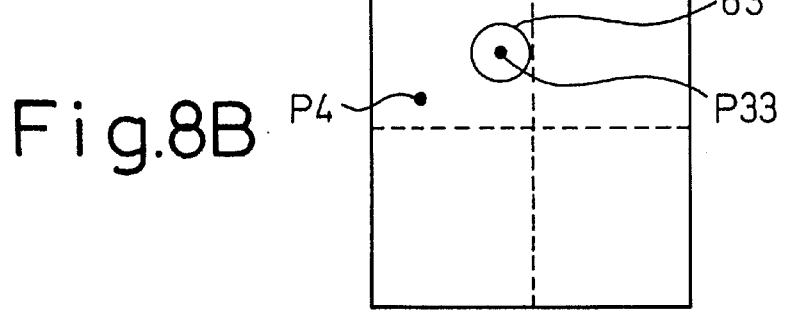
Fig.8B

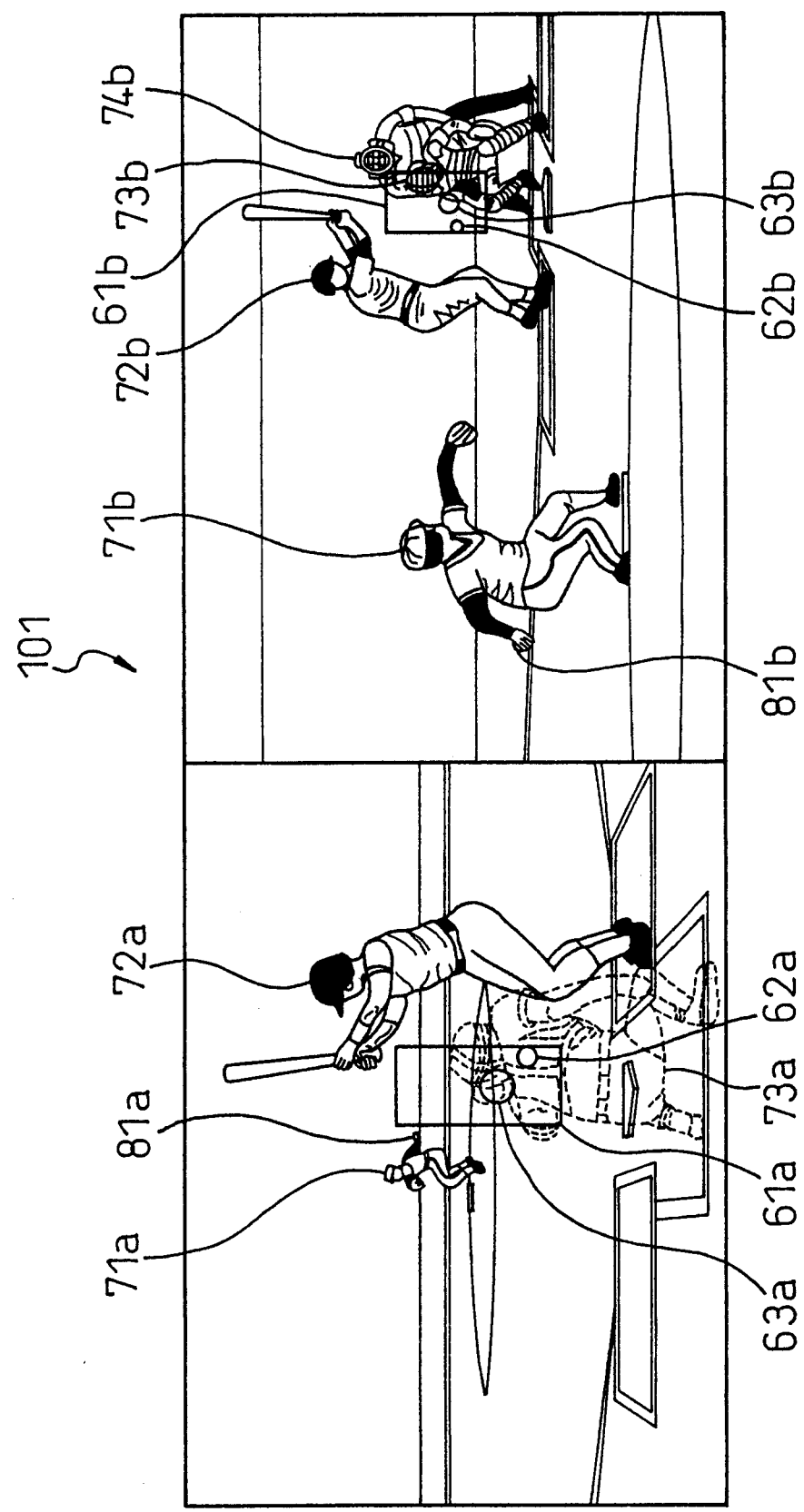

COMPUTER READABLE PROGRAM PRODUCT STORING PROGRAM FOR CURSOR DISPLAY IN BALL-PLAYING GAME, SAID PROGRAM, AND CURSOR DISPLAY PROCESSING APPARATUS AND METHOD FOR BALL-PLAYING TYPE GAME

The present disclosure relates to subject matter contained in Japanese Patent Application No. 2000-149076, filed on May 19, 2000, the disclosure of which is expressly incorporated herein by reference in its entirety.

BACKGROUND OF THE INVENTION

1. Field of the Invention

The present invention relates to a computer readable program product storing a program for processing of a cursor display of a ball-playing type game using a joystick or other control device, such a program, and a ball-playing type game processor and method.

2. Description of the Related Art

At the present time, in sports types games, not only one-against-one contest games, but also group-against-group contest games have been realized such as tennis, soccer, basketball, American football, and baseball.

To play such sports type games, it is necessary to operate control units (control panels, keypads, etc.) provided in advance in an arcade machine or specialized game machine (PlayStation (made by Sony Computer Entertainment), Dreamcast (made by Sega Enterprise), etc.)

The control unit is in general comprised of a plurality of keys (or buttons) or a joystick. Whether a sports type game or a role-playing game, a control system comprised of a limited number of buttons and number of joysticks on a control unit is incorporated. Of course, a game can be played on even a personal computer. If using a keyboard, keys necessary for control of the game are assigned from the keyboard.

In baseball, soccer, basketball, and other ball-playing type games in sports type games, generally the movement of the ball itself cannot be controlled by the buttons or joystick. Instead, the user can control the motion of the player holding the ball or the movement of the player with respect to an incoming ball so as to indirectly control the direction or force of the next movement of the ball.

For example, in a baseball game, consider the case when the pitcher throws the ball in the direction of home base. In this case, a cursor is displayed inside a strike zone displayed on the screen or near it for designating the position of the thrown ball (hereinafter referred to as the "ball position"). This cursor is often displayed in the shape of a circle. The user can operate the joystick to make the cursor move on the display screen and designate any ball position.

To designate the above ball position, in general it is necessary to operate the joystick or other control device. As this type of technology, there is for example Japanese Unexamined Patent Publication (Kokai) No. 10-105328. This publication discloses the art of using a conversion constant to convert from one coordinate value different from the conversion constant to another coordinate value when converting a position signal in accordance with the tilt position of the joystick to a two-dimensional coordinate value on the image. By using the conversion constant, it is possible to designate the ball position in the rectangular strike zone.

Summarizing the problem to be solved by the invention, in a baseball game, the strike zone includes portions where the ball position has to be accurately designated and portions where accurate designation is unnecessary. In a baseball game, the ball passing near the boundary of the strike zone and the outside of the strike zone (hereinafter referred to as the ball zone) sometimes is hard to hit solidly even if the batter were to swing. In such a case, for the user controlling the pitcher to prevent easy hits by the batter, it was necessary to accurately designate the ball position near the boundary between the strike zone and the ball zone.

In the above-mentioned Japanese Unexamined Patent Publication (Kokai) No. 10-105328, however, since the tilt position of the control device was converted to a position on the screen using a conversion constant, no difference at all could be observed in control of the ball position either near the outer periphery of the strike zone where the batter has a hard time hitting the ball or at the center portion of the strike zone. Therefore, even if trying to control the ball position with respect to the pitcher's best pitch near the boundary between the strike zone and outside the zone, fine adjustment of the ball position was not possible and fine control of the desired ball position was difficult.

On the other hand, in the batting zone, the general practice for the batter is to swing at the center portion of the zone rather than swing near the boundary between the zone and outside the zone.

SUMMARY OF THE INVENTION

An object of the present invention is to provide a computer readable program product storing a program for processing of the cursor display of a ball-playing game enabling fine adjustment of the cursor display in the strike zone or batting zone in accordance with the desire of the user by an approach different from the above publication, such a program, and a cursor display processor and method for a ball-playing type game.

According to a first aspect of the present invention, there is provided a computer readable program product storing a program for processing of a cursor display in a ball-playing type game, the program product storing a program for making a computer receive as input tilt data output in accordance with operation by a user using a control device outputting tilt data expressing a tilt angle and tilt direction, calculate coordinate data based on the input tilt data using a first function linked with a first axial direction and a second function different from the first function and linked with a second axial direction for two intersecting axes when converting the input tilt data to two-dimensional coordinates, and process movement of the cursor display based on the calculated coordinate data.

According to a second aspect of the present invention, there is provided a program for processing a cursor display of a ball-playing type game, the program making a computer receive as input tilt data output in accordance with operation by a user using a control device outputting tilt data expressing a tilt angle and tilt direction, calculate coordinate data based on the input tilt data using a first function linked with a first axial direction and a second function different from the first function and linked with a second axial direction for two intersecting axes when converting the input tilt data to two-dimensional coordinates, and process movement of the cursor display based on the calculated coordinate data.

According to a third aspect of the present invention, there is provided a cursor display processor for a ball-playing type game comprising a computer readable program product storing a program for processing of a cursor display of a ball-playing type game, a computer for reading and executing at least part of the program from the program product, and a display for displaying the ball-playing type game realized by the computer, the computer receiving as input tilt data output in accordance with operation by a user using a control device outputting tilt data expressing a tilt angle and tilt direction, calculating coordinate data based on the input tilt data using a first function linked with a first axial direction and a second function different from the first function and linked with a second axial direction for two intersecting axes when converting the input tilt data to two-dimensional coordinates, and displaying movement of the cursor display on the display based on the calculated coordinate data.

According to a fourth aspect of the present invention, there is provided a cursor display processing method for a ball-playing type game for processing of a cursor display of a ball-playing type game, comprising receiving as input tilt data output in accordance with operation by a user using a control device outputting tilt data expressing a tilt angle and tilt direction, calculating coordinate data based on the input tilt data using a first function linked with a first axial direction and a second function different from the first function and linked with a second axial direction for two intersecting axes when converting the input tilt data to two-dimensional coordinates, and processing movement of the cursor display on the display based on the calculated coordinate data.

In the above first, second, third, and fourth aspects of the invention, it is possible to reduce the amount of movement of the cursor display with respect to an amount of operation of the control device the closer to an operation near the limit of tilt of the control device by using the first and second functions. In this case, the range of movement of the cursor display may be within a rectangular shape including a strike zone. Further, the first and second functions may be functions expressing curves having tilt data as variables or may use sines.

Further, in the first, second, third, and fourth aspects of the invention, it is possible to increase the amount of movement of the cursor display with respect to an amount of operation of the control device the closer to an operation near the limit of tilt of the control device by using the first and second functions. In this case, the range of movement of the cursor display may be within a rectangular shape forming a batting zone. Further, the first and second functions may be functions expressing curves having tilt data as variables or includes a sine. In particular, it is possible to further correct a cursor display position so as to track a position of passage of a ball determined at the pitching in the batting zone when making the cursor display move.

BRIEF DESCRIPTION OF THE DRAWINGS

These and other objects and features of the present invention will become clearer from the following description of the preferred embodiments given with reference to the attached drawings, in which:

FIG. 7 is a view of an example of a function $Gh(x)$ for designating the position of the cursor;

FIG. 8A is a first view schematically showing the state of movement of a batting cursor, and FIG. 8B is a second view schematically showing the state of movement of the batting cursor, according to an embodiment of the present invention;

FIG. 16 is a view of an example of the display image in the case of displaying an image from a plurality of perspectives.

DESCRIPTION OF THE PREFERRED EMBODIMENTS

Preferred embodiments of the present invention will be explained below with reference to the drawings. In the following explanation, a baseball game is used as an example among the various ball-playing type games.

Figure 1:
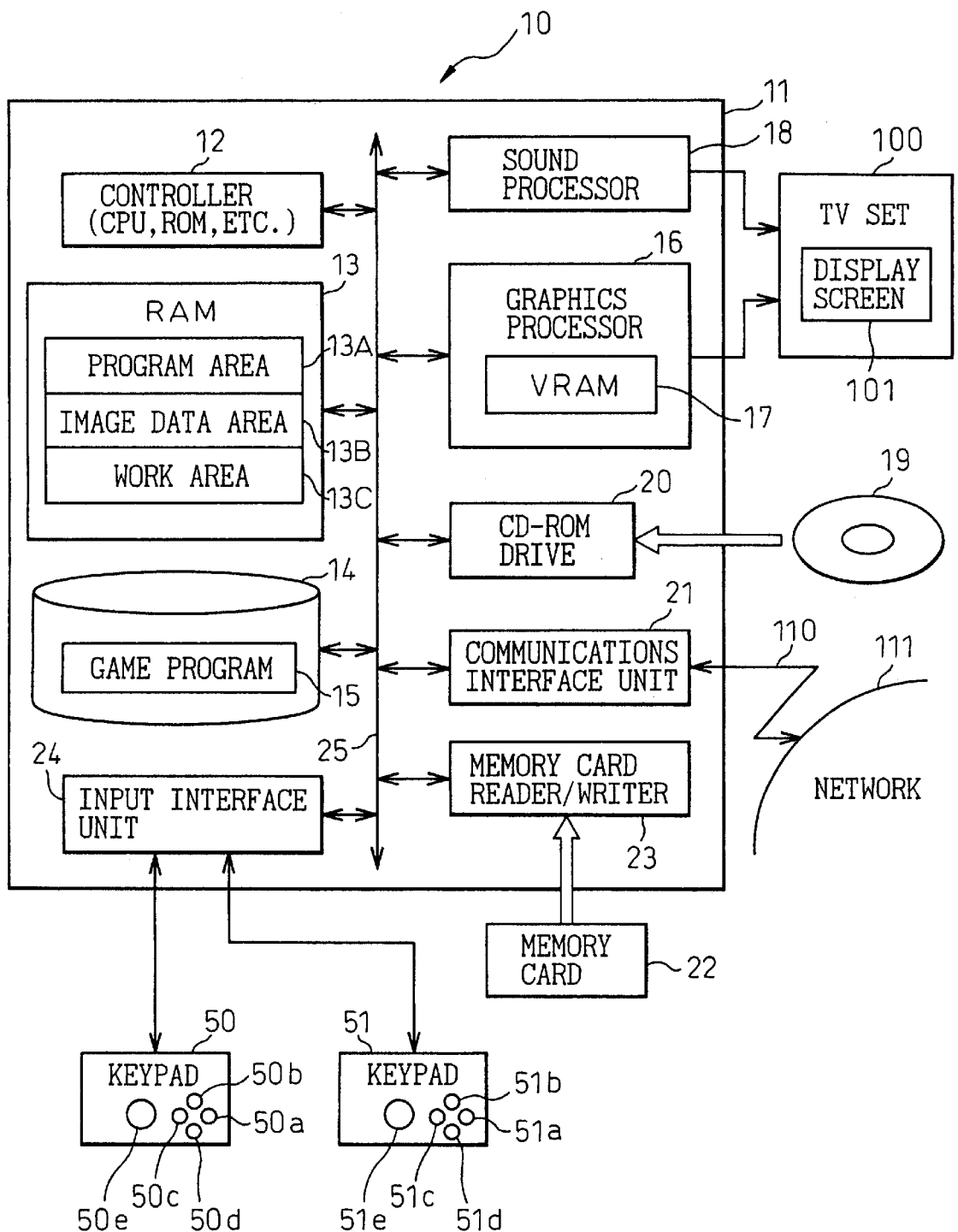
FIG. 1 is a block diagram of an example of the hardware configuration of an embodiment of the present invention.

First, an explanation will be made of the configuration using FIG. 1. FIG. 1 shows an example of the configuration of a video game system according to an embodiment of the present invention. The video game system 10 shown in FIG. 1 is provided with the functions of a ball-playing type game processor according to an embodiment of the present invention. Further, the video game system 10 executes a program stored on a computer readable program product according to an embodiment of the present invention. Further, the video game system 10 is used for working the ball-playing type game processing method according to an embodiment of the present invention.

The video game system 10 includes, for example, a game console 11 for processing a video game in accordance with a program, a keypad 50 for interactively controlling the video game, and a television set (hereinafter called a "TV set") having a cathode ray tube (CRT) etc. as a monitor with speakers. Further, this video game system 10 is provided with a communications interface unit 21 and is connected to a network 111 by a communications line 110 for data communications with another network apparatus.

A keypad 50 has a group of buttons 50a, 50b, 50c, 50d, etc. or a joystick 50e able to be operated by the user (operator). Instructions due to the button operation or joystick operation of the user are given to the game console 11. A keypad 51 further has for example the group of buttons 51a, 51b, 51c, 51d, etc. or the joystick 51e operable by the user.

Here, the buttons or joystick have the functions of inputting a pitching operation of the pitcher, a swinging operation of the batter, a stealing operation of a runner, and a catching/throwing operation of a fielder in the operation of a baseball game explained later. Further, the joysticks 50e, 51e have the function of designating the position of the cursor showing the ball position of the pitcher in the strike zone of the screen or around it and the position of the cursor showing the batting position of the batter (position through which the bat passes due to a swing) in the batting zone.

The TV set 100 displays a video (image) or outputs sound in accordance with the content of the game based on a video signal and sound signal output from the game console 11.

The game console 11 has an internal bus 25. The internal bus 25 has connected to it a controller provided with a central processing unit (CPU), read only memory (ROM), and other units, a random access memory (RAM) 13, and a hard disk drive (HDD) 14.

The controller 12 controls the hardware as a whole and stores all or part of the program in the RAM 13 for execution of the game processing.

The RAM 13 is provided with a program area 13A, an image data area 13B, a work area 13C, etc. The program area 13A stores the program of the game. Specifically, the program area 13A stores all or part of the game program read by the CD-ROM drive 20 from the CD-ROM 19. The image data area 13B stores image data such as the background or game characters required in the process of execution of the program. The work area 13C stores various types of data generated in the process of execution of the program.

Note that the game program 15 and image data can be supplied from an HDD 14 other than a CD-ROM 19. In this case, the game program 15 or image data may be stored in a storage medium (hard disk) of the HDD 14. The hard disk may store the game program or image data installed in advance or downloaded through the communications line 110 from the network 111.

Further, the internal bus 25 has connected to it an input interface unit 24, a sound processor 18, and a graphics processor 16. The keypads 50, 51 are connected through the input interface unit 24 to the internal bus 25. Further, the TV set 100 connects the sound processor 18 and graphics processor 16 through it to the internal bus 25.

The graphics processor 16 is provided with a video random access memory (VRAM) 17 having a frame buffer. The graphics processor 16 generates a video signal based on the image data stored in the frame buffer by instructions from the controller 12 along with execution of the program and outputs the video signal to the TV set 100. Due to this, an image is displayed on the display screen 101 of the TV set 100 by the image data stored in the frame buffer.

The sound processor 18 generates a sound signal expressing voices, background music (BGM), sound effects, etc. in accordance with the instruction from the controller 12 and outputs the sound signal to the TV set 100.

The internal bus 25 further has connected to it a CD-ROM drive 20 and a memory card reader-writer 23. The CD-ROM drive 20 reads the game program, image data, sound data, etc. stored in the program product, that is, the CD-ROM 19. The memory card reader-writer 23 writes data to and reads data from the memory card 22 in accordance with the control of the controller 12. The data written in the memory card 22 includes data showing the intermediate elapse of the game, data indicating the environmental settings of the game, etc.

Next, a detailed explanation will be given of an embodiment of the present invention using an example of a baseball game. In the present embodiment, the ball position or batting position can be designated by operation of joysticks 50e and 51e. Here, the ball position means a position for designation of the course by which the ball will pass in the strike zone or a region around it when a character of the game, that is, the pitcher, pitches the ball. The batting position means a position (displacement position) through which the bat is made to pass when the batter swings the bat.

The ball position and batting position are moved in accordance with the data showing the tilt direction and tilt angle of the joysticks 50e and 51e (hereinafter referred to as the "tilt data"). And the cursor is displayed at both the ball position and batting position. In the present embodiment, the display position of the cursor in the strike zone or its surroundings becomes the ball position, while the display position of the cursor in the batting zone becomes the batting position. Note that the data showing the tilt direction and tilt angle of the joysticks 50e and 51e (tilt data) is input to the game console 11 through the keypads 50 and 51.

Figure 2:
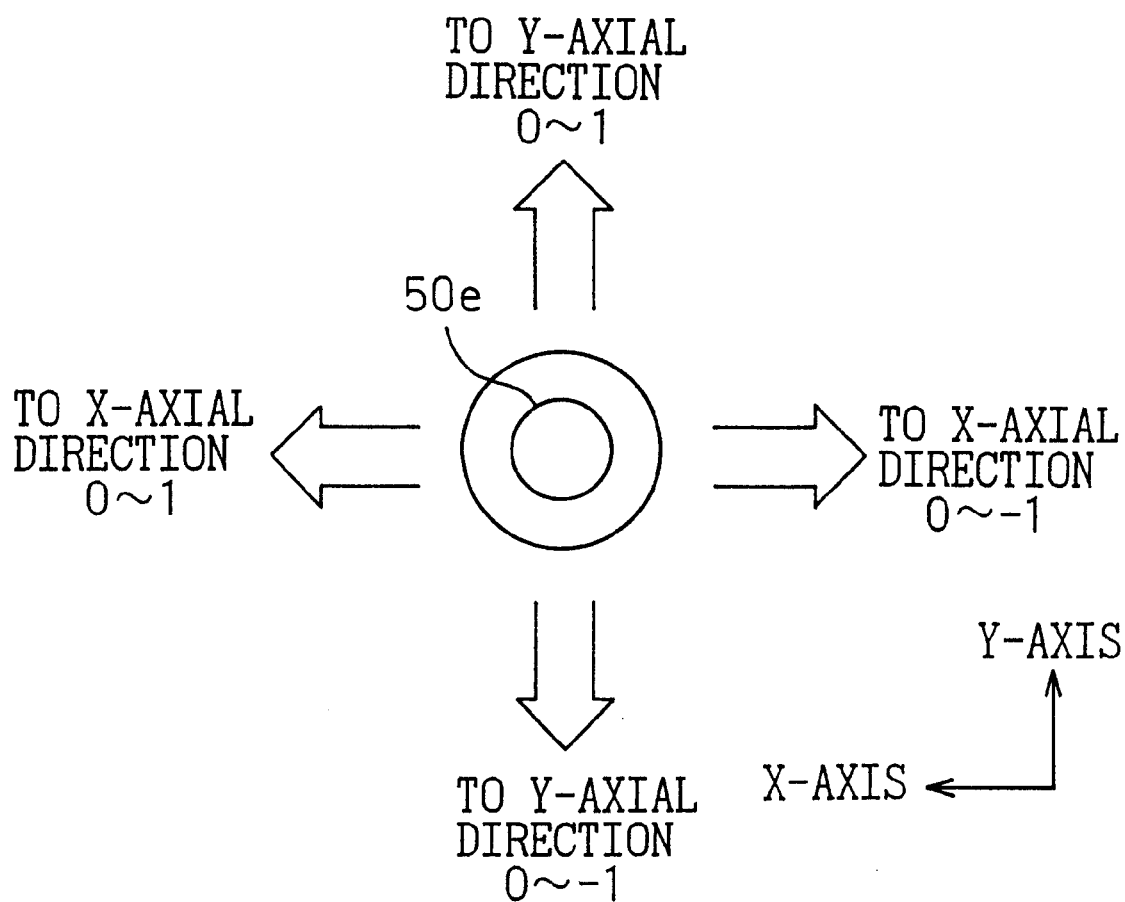
FIG. 2 is a view of the relationship between a tilt angle of a joystick and tilt data, according to an embodiment of the present invention.

FIG. 2 is a view explaining the tilt data showing the state of a joystick. Note that in FIG. 2, the explanation is given using one joystick 50e, but the same applies to the other joystick 51e as well.

The joystick 50e is a device for inputting data in an analog fashion. It can be made to tilt in all directions 360 degrees around. The same applies to the joystick 51e. If the joystick 50e is tilted, the tilt direction and tilt angle are displayed by two-dimensional coordinate values. In the present embodiment, the tilt angle when tilting to the right or left in FIG. 2 is expressed as a coordinate value of the x-axial direction, while the tilt angle when tilting up and down is expressed as a coordinate value of the y-axial direction.

The tilt angle with respect to the vertical and horizontal directions is expressed for example by real numbers. In the example of FIG. 2, the tilt angle of the joystick 50e to the left direction is for example expressed by a real number of 0 to 1 of the x-axis. The tilt angle of the joystick 50e to the right direction is for example expressed by a real number of −1 to 0 of the x-axis. The tilt angle of the joystick 50e to the upward direction is for example expressed by a real number of 0 to 1 of the y-axis. The tilt angle of the joystick 50e to the downward direction is for example expressed by a real number of −1 to 0 of the y-axis. Note that the numerical value showing the tilt angle shows a larger tilt angle the larger the absolute value of that value. Below, the numerical value showing the tilt angle in the x-axial direction will be called the x-axis tilt data. Similarly, the numerical value showing the tilt angle in the y-axial direction will be called the y-axis tilt data.

Note that the above x- and y-axial direction tilt data are obtained by converting the data corresponding to the states of the joysticks 50e and 51e sent from the keypads 50 and 51 to the game console 11. The tilt angles of the x-axial direction and y-axial direction of the joysticks 50e and 51e are for example expressed by real numerical values of 0 to 255. Consider the case where these values are input to the game console Assume that the numerical value expressing the tilt angle in the x-axial direction when tilting the joystick 50e the maximum in the right direction of the x-axial direction is "0" and that the numerical value expressing the tilt angle in the x-axial direction when tilting the joystick 50e the maximum in the left direction of the x-axial direction is "255". Further, assume that the numerical value expressing the tilt angle in the y-axial direction when tilting the joystick 50e the maximum in the downward direction of the y-axial direction is "0" and that the numerical value expressing the tilt angle in the y-axial direction when tilting the joystick 50e the maximum in the downward direction of the y-axial direction is "255".

In this case, if the numerical value expressing the tilt angle is a value in the middle of "255" (for example, "128"), the joystick is in a substantially vertical state. The tilt angle is shown from the difference from the value in the middle of "255". Further, if the value in the middle of "255" is subtracted from the numerical value expressing the tilt angle and the result is divided by the value in the middle of "255", it is possible to replace it by a value of −1 to 1 as shown in FIG. 2.

Figure 3:
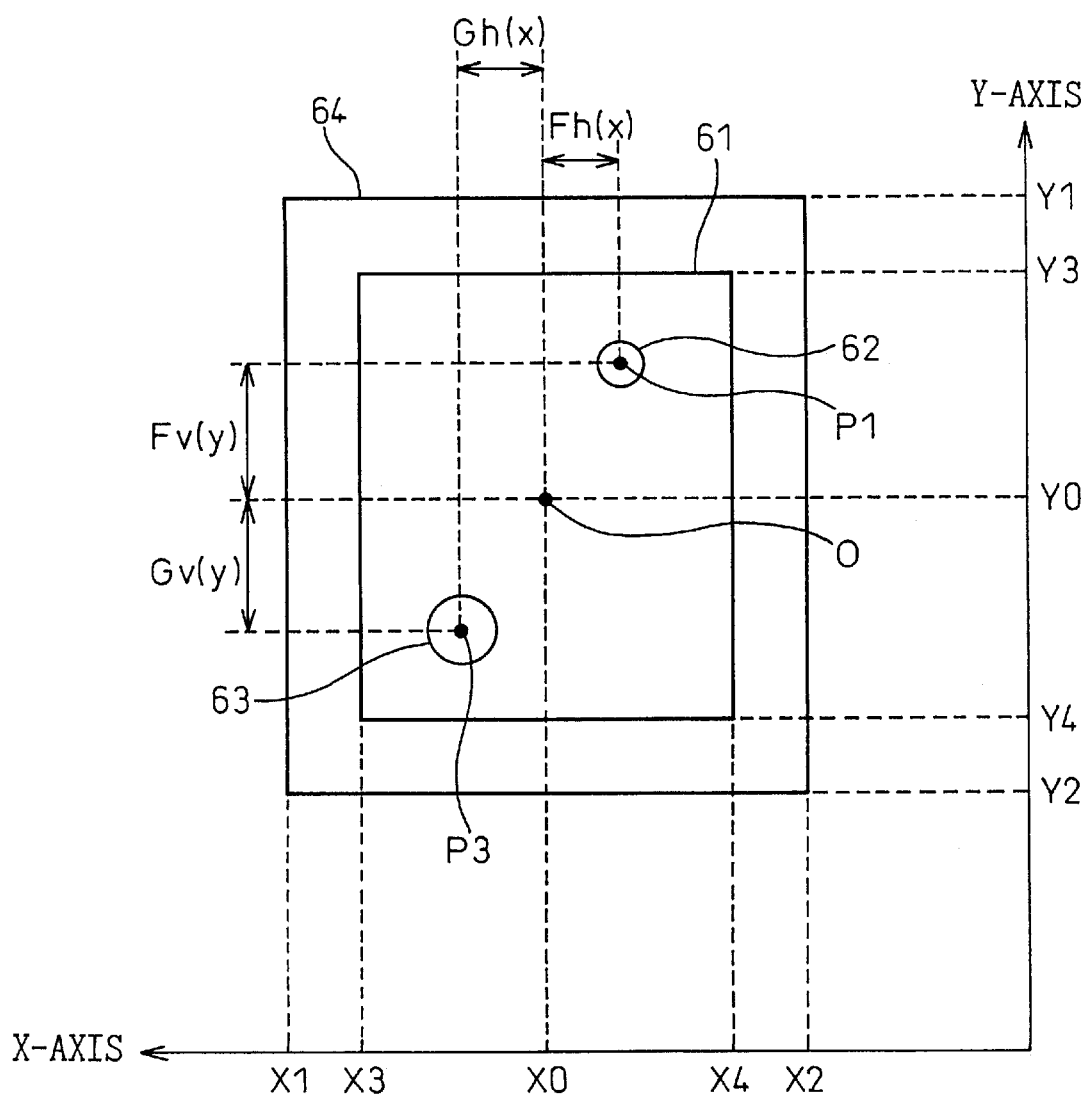
FIG. 3 is a view of a coordinate system of a plane including a strike zone, according to an embodiment of the present invention.

In the baseball game of the present embodiment, the display of the position of the cursor when pitching or batting is controlled in accordance with the tilt data of the joystick. FIG. 3 is a view schematically showing the strike zone according to the present embodiment. In FIG. 3, reference numeral 61 shows the strike zone. As shown in FIG. 3, in the present embodiment, the strike zone 61 is set to the plane parallel to the X-Y plane in the three-dimensional space.

In FIG. 3, the coordinates of the reference position O of the strike zone 61 are (X0,Y0). This is the position of the strike zone 61 in the plane including the strike zone 61. The strike zone 61 is for example displayed on the screen as a rectangular frame centered about the reference position 0. In the example of FIG. 3, the range in the X-axial direction of the strike zone 61 is the range from X4 to X3. Further, the range in the Y-axial direction of the strike zone 61 is the range from Y4 to Y3.

Further, the cursor 62 used at the time of pitching is displayed at the position P1 inside the strike zone 61 or around the strike zone 61. The cursor 62 is displayed as for example a circle. The position of the cursor 62 is the reference position for making the cursor 62 move. The cursor 62 may be moved in the strike zone 61 and in the range 64 around it. As one example, the range of an X-axial value of X2 to X1 and a Y-axial value of Y2 to Y1 is the movable range of the cursor 62.

The movable range 64 of the cursor 62 is set wider than the strike zone 61 since the user sometimes deliberately pitches the ball to a course outside the strike zone 61. If pitching the ball to a course outside the strike zone 61, the probability of the batter making a solid hit becomes extremely low. Therefore, pitching the ball to a course outside the strike zone 61 is an effective means for advantageously playing against another user.

Further, the cursor used at the time of batting (hereinafter called the "batting cursor") 63 is displayed at a position P3 inside the strike zone 61. For example, the batting cursor 63 is displayed by a circle. The position of the batting cursor 63 is the reference position for making the batting cursor 63 move. The batting cursor 63 can be moved in the strike zone 61. In the example of FIG. 3, the range of the X-axial value of X3 to X2 and the Y-axial value of Y3 to Y4 is the movable range of the batting cursor 63.

In the present embodiment, the target position of movement of the cursor 62 is determined in accordance with the state of the joystick 60e. The cursor 62 is moved toward the target position of movement. The target position of movement is displayed by displacement from the reference position O of the strike zone 61. In the example of FIG. 3, the position P1 of the cursor 62 and the target position of movement match. Hereinafter, the distance in the X-axial direction from the reference position O of the strike zone 61 to the target position of movement, the position of the cursor 62, and the batting cursor will be referred to as the X-axial direction displacement, while the distance in the Y-axial direction will be referred to as the Y-axial direction displacement.

As shown in FIG. 3, the X-axial direction displacement of the target position of movement of the pitching position is defined by a function Fh(x) having as a variable the tilt data (x) showing the x-axial direction tilt angle of the joystick 50e. Further, the Y-axial direction displacement of the batting cursor 63 is defined by the function Gv(y) having as a variable the tilt data (y) showing the y-axial direction tilt angle of the joystick.

Figure 4:
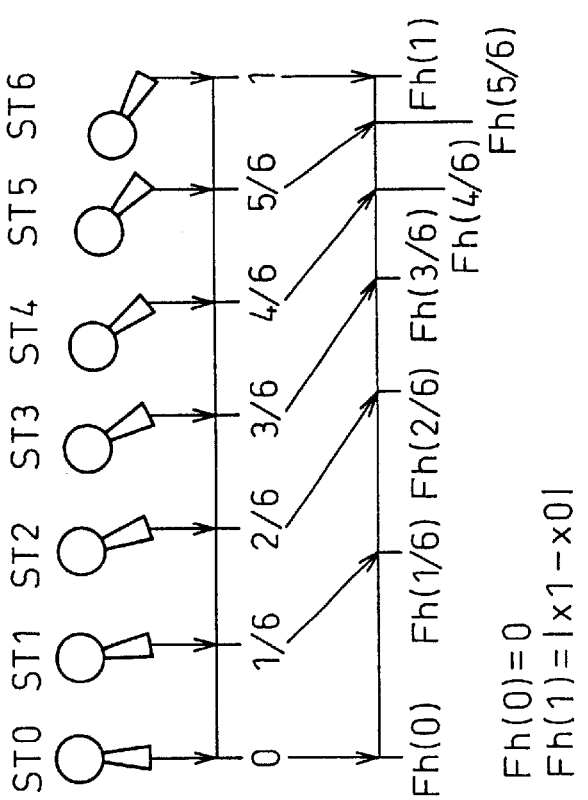
FIG. 4A shows the change in state of the joystick.
FIG. 4B shows the tilt data in the x-axial direction in accordance with the state of the joystick.
FIG. 4C shows the displacement in the X-axial direction of the target position of movement obtained in accordance with the tilt data, according to an embodiment of the present invention.

FIG. 4A, FIG. 4B, and FIG. 4C schematically show an example of the change in target position of movement corresponding to a change in state of the joystick 50e. Note that FIG. 4A, FIG. 4B, and FIG. 4C are examples of the case where the joystick 50e is tilted in the positive direction of the x-axis. FIG. 4A shows the change in state of the joystick 50e, FIG. 4B shows the x-axial direction tilt data corresponding to the state of the joystick 50e, and FIG. 4C show the value of the function Fh(x) obtained in accordance with the tilt data.

FIG. 4A shows the tilted states of the joystick 50e. As one example, seven states ST0, ST1, ST2, ST3, ST4, ST5, and ST6 are shown. The state ST0 shows the state where the joystick 50e is not tilted. The tilt angle in the positive direction of the x-axis becomes larger in order starting from the state ST0 from, in order, the state ST1 to the state ST2, the state ST3, the state ST4, the state ST5, and the state ST6. The state ST6 is the state where the joystick is tilted to the maximum in the positive direction of the x-axis.

The tilt data of the above seven states ST0, ST1, ST2, ST3, ST4, ST5, and ST6 are respectively "0", "1/6", "2/6", "3/6", "4/6", "5/6", and "1" (see FIG. 4B). That is, the seven states of the joystick have values of tilt data increasing by 1/6 with each state from the state ST0.

The displacements of the target position of movement in accordance with the tilt data "0", "1/6", "2/6", "3/6", "4/6", "5/6", and "1" are, respectively, Fh(0), Fh(1/6), Fh(2/6), Fh(3/6), Fh(4/6), Fh(5/6), and Fh(1) (see FIG. 4C). Note that the value of Fh(0) is 0. Further, the value of Fh(1) is |X1−X0| (absolute value of difference of X1 and X0).

As shown in FIG. 4C, the larger the tilt angle of the joystick 50e, the smaller the amount of change of the target position of movement corresponding to the amount of change of the tilt angle of the joystick 50e. That is, the value of the function Fh(x) showing the X-axial direction displacement of the target position of movement becomes as in the following function:

$$\{Fh(1/6)-Fh(0)\}>\{Fh(2/6)-Fh(1/6)\}>\{Fh(3/6)-Fh(2/6)\}>\{Fh(4/6)-Fh(3/6)\}>\{Fh(5/6)-Fh(4/6)\}>\{Fh(1)-Fh(5/6)\} \quad 1$$

In this way, the larger the tilt angle of the joystick 50e, the smaller the amount of change of the target position of movement corresponding to the change of the tilt angle of the joystick 50e, so the larger the tilt angle, the slower the speed of movement of the target position of movement and the easier fine adjustment. As shown in FIG. 3, if the tilt angle of the joystick 50e becomes larger, the displacement of the target position of movement of the cursor 62 becomes larger and the target position becomes closer to the region around the strike zone 61. That is, fine adjustment of the target position of movement in the region surrounding the strike zone 61 becomes easy.

Figure 5:
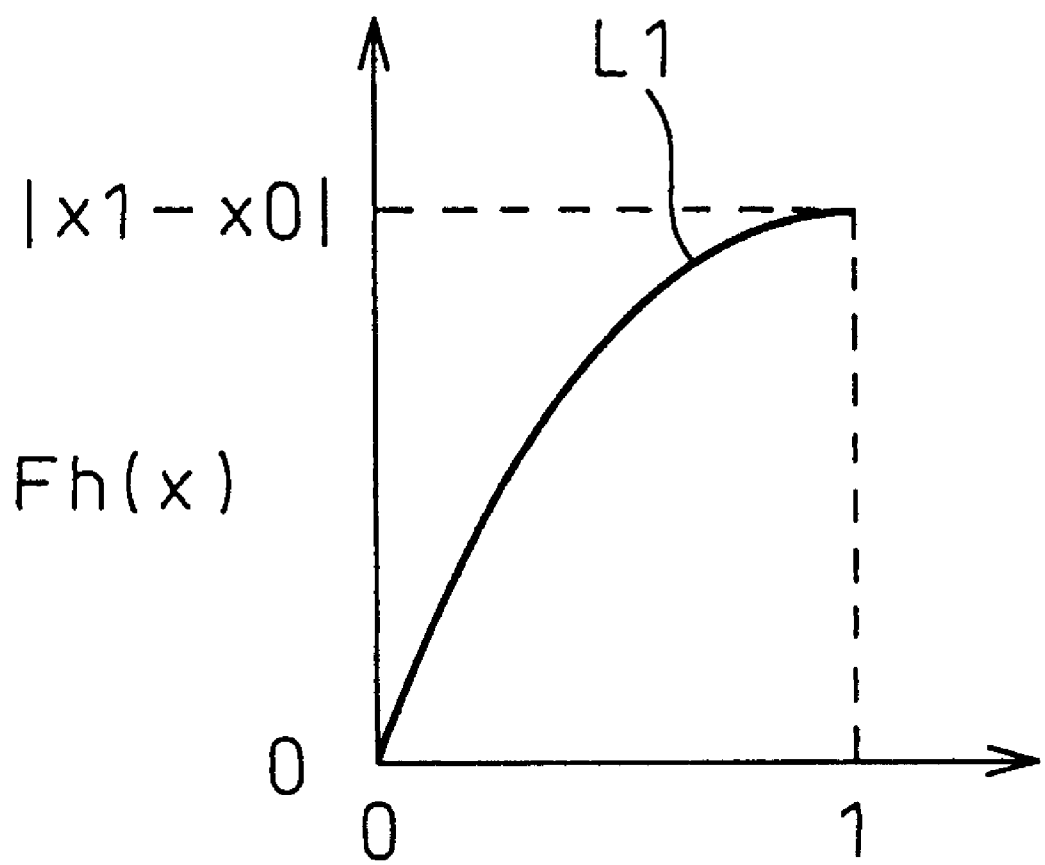
FIG. 5 is a view of an example of a function $Fh(x)$ for designating the position of the cursor.

FIG. 5 shows an example of the function Fh(x). FIG. 5 shows the absolute value of the tilt data on the horizontal axis (|x|) and shows the value of the function Fh(x) on the vertical axis. The curve L1 shown in FIG. 5 is the sine curve using a sine. As shown in FIG. 5, the function Fh(x) expressed by the curve L1 becomes larger in value the larger the absolute value of the tilt data. Further, the larger the absolute value of the tilt data, the smaller the gradient of the tangent of the curve L1. The smaller the gradient of the tangent of the curve L1, the smaller the change of the value of the function Fh(x) with respect to a change in the absolute value of the tilt data.

The function Fh(x) can be expressed for example by the following equation:

$$Fh(x)=|X1-X0|\cdot\sin(|x\cdot\pi/2|) \quad 2$$

Here, x is the x-axial direction tilt data, while $\pi$ is pi. X1 is the maximum value in the X-axis of the movable region of the cursor, while X0 is the X-axial coordinate value of the reference position of the movable region (same as reference position O of the strike zone).

If the x-axial direction tilt data is a positive value, the X-axial coordinate value of the target position of movement is found by adding the value of Fh(x) to the X-axial coordinate value X0 of the reference position O of the movable region of the cursor. Further, if the x-axial direction tilt data is a negative value, the X-axial coordinate value of the target position of movement is found by subtracting the value of Fh(x) from the X-axial coordinate value X0 of the reference position O of the movable region of the cursor.

It is possible to similarly calculate the displacement from the reference position of the target position of movement in the Y-axial direction. For example, the function Fv(y) is expressed by the following equation:

$$Fv(y)=|Y1-Y0|\cdot\sin(|y\cdot\pi/2|) \quad 3$$

Here, y is the y-axial direction tilt data. Y1 is the maximum value of the Y-axis of the movable region of the cursor, while Y0 is the Y-axial coordinate value of the reference position O of the movable region. If the tilt data is a positive value, the Y-axial coordinate value of the target position of movement is found by adding the value of Fv(y) to the Y-axial coordinate value Y0 of the reference position O of the movable region of the cursor. Further, if the tilt data is a negative value, the Y-axial coordinate value of the target position of movement is found by subtracting the value of Fv(y) from the Y-axial coordinate value Y0 of the reference position O of the movable region of the cursor.

If the target position of movement corresponding to the state of the joystick 50e is found, the position of the cursor is moved so as to approach this target position of movement. The change in the position of the cursor will be explained next using FIG. 6A, FIG. 6B, FIG. 6C, and FIG. 6D. FIG. 6A, FIG. 6B, FIG. 6C, and FIG. 6D are views schematically showing the state of movement of the cursor.

Figure 6A:
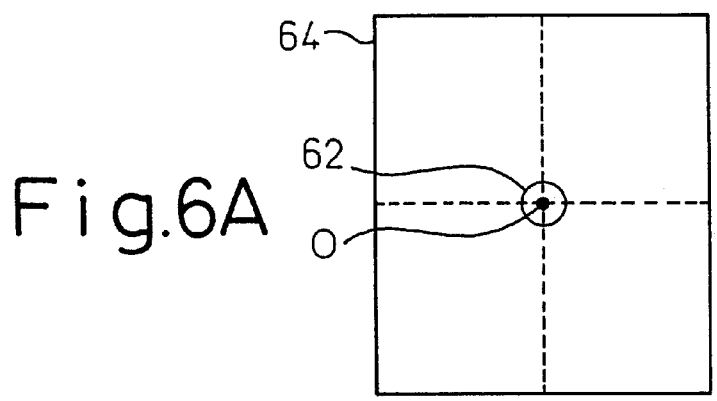
FIG. 6A is a first view schematically showing the state of movement of the cursor.
Figure 6B:
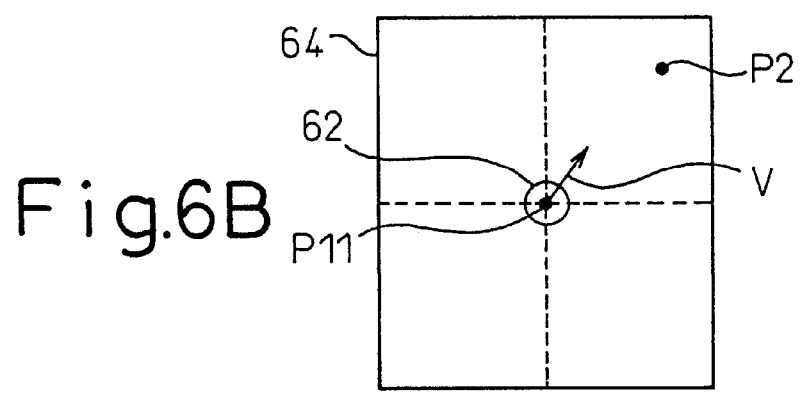
FIG. 6B is a second view schematically showing the state of movement of the cursor.

In FIG. 6A, the position of the cursor 62 is the reference position O in the movable range 64. If the joystick 50e is tilted in this state to designate the cursor position, as shown in FIG. 6B, the target position of movement P2 corresponding to the state of the joystick is determined. If this happens, the cursor 62 moves from position P11 toward the target position of movement at the preset speed V. The speed V is the amount of movement of the cursor 62 per frame for example.

Figure 6C:
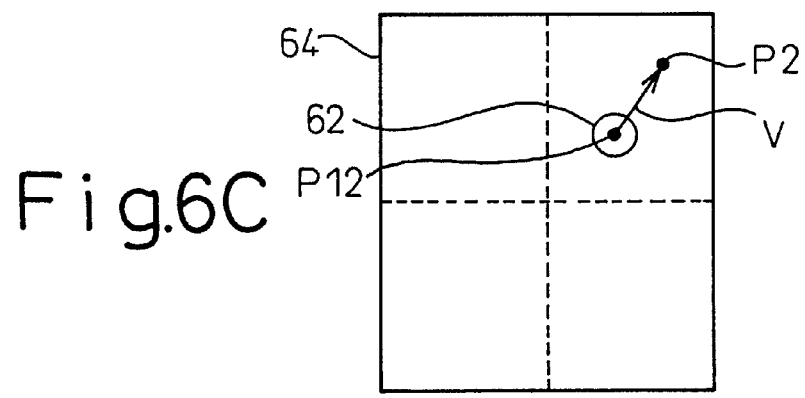
FIG. 6C is a second view schematically showing the state of movement of the cursor.
Figure 6D:
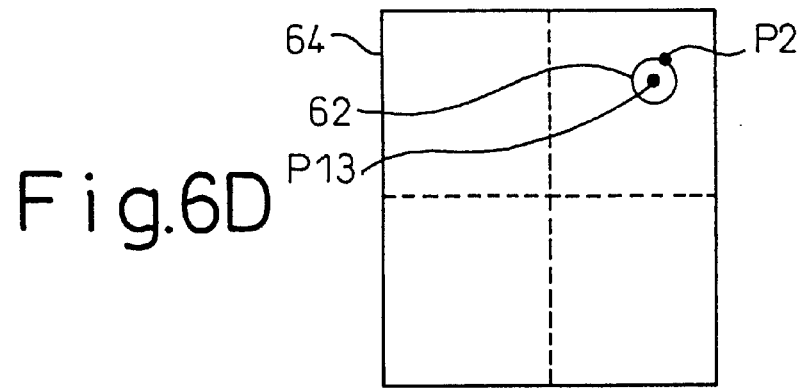
FIG. 6D is a second view schematically showing the state of movement of the cursor, according to an embodiment of the present invention.

Next, the cursor 62 is made to gradually approach the target position of movement P2 such as for example by moving to the position P12 and position P13 with each frame as shown in FIGS. 6C and 6D. When the cursor 62 can reach the target position of movement P2, the cursor 62 is moved to the same position as the target position of movement P2.

In this way, in the present embodiment, the cursor 62 is controlled to track the target position of movement. Therefore, it is possible to make the cursor 62 move smoothly at all times.

Further, when the distance between the target position of movement P2 and the position of the cursor 62 becomes less than a preset distance, it is possible to make it so that the cursor 62 cannot further approach the target position of movement P2. This is a measure for preventing the position of the cursor 62 from shaking.

That is, when the user operates the joystick, it is difficult to fix the tilt angle at a constant angle. That is, even if the user intends to hold a constant angle, in actuality the tilt angle of the joystick will end up changing. Therefore, if making the cursor 62 accurately track the target position of movement at all times, the position of the cursor 62 on the display screen will end up successively changing (for example, every frame) and the image will be hard to view.

Therefore, by making it so that the position P1 of the cursor 62 cannot become closer to the target position of movement P2 when the distance between the target position of movement P2 and the position of the cursor 62 becomes less than a preset distance, it is possible to control the cursor display so as not to track the position as it is further due to shaking of the hand.

Next, an explanation will be made of control of the movement of the batting cursor corresponding to the operation of the joystick. In general, a user of the team at bat cannot find out which course the ball will be pitched over until the ball is pitched. Therefore, the user of the team at bat waits for the ball in the state with the batting cursor displayed near the center of the strike zone. Further, the user predicts the position where the ball will arrive in the strike zone or its surroundings from the trajectory of the ball after it is pitched. To hit the ball, it is necessary to make the batting cursor move to the predicted position before the ball reaches the strike zone or its surroundings.

If waiting for the ball with the batting cursor displayed near the center of the strike zone, and the ball reaches the strike zone near its center, only a small amount of movement of the batting cursor will be enough. In this way, it is desirable that the position of the batting cursor can be finely adjusted near the center of the strike zone to enable the ball to be hit accurately. Therefore, in the present embodiment, conversely from control of movement of the cursor at the time of pitching, the display of the batting cursor is controlled to enable fine adjustment of the position of the batting cursor near the center of the strike zone.

The position of the batting cursor can be calculated by a function having as a variable the value of the tilt data of the joystick. For example, it is possible to use the function Gh(x) having as a variable the x-axial direction data of the tilt data to find the position of the batting cursor (X-axial direction displacement from the reference position O of the strike zone). Similarly, it is possible to use the function Gv(y) having as a variable the y-axial direction data of the tilt data to find the position of the batting cursor (Y-axial direction displacement from the reference position O of the strike zone).

FIG. 7 shows an example of the function Gh(x). FIG. 7 shows the absolute value of the x-axial direction tilt data on the horizontal axis and shows the value of the function Gh(x) on the vertical axis. The curve L2 shown in FIG. 7 is the sine curve. As shown in the figure, the function Gh(x) expressed by the curve L2 becomes larger in value the larger the absolute value of the tilt data. Further, the gradient of the tangent of the curve L2 becomes larger the larger the absolute value of the tilt data. The smaller the gradient of the tangent of the curve L2, the smaller the change of the value of the function Gh(x) with respect to a change of the absolute value of the tilt data, that is, the slower the speed of movement.

In this way, by making the curve L2 so that the closer the absolute value of the tilt data to 0, the smaller the gradient of the tangent of the curve L2, when the joystick is close to vertical, fine adjustment of the position of the batting cursor becomes easier. When the joystick is close to vertical, the value of the function Gh(x) is also small, so the batting cursor is near the center of the strike zone. Therefore, by using the function Gh(x) expressed by the curve L2, fine adjustment of the batting cursor near the center of the strike zone becomes easier.

The function Gh(x) can be expressed for example by the following equation:

$$Gh(x)=|X3-X0|\cdot\{\sin(|x|\cdot(\pi/2)-\pi/2)+\} \quad\quad 4$$

Here, x is the x-axial direction tilt data. X3 is the maximum value in the X-axis of the movable region of the batting cursor, while X0 is the X-axial coordinate value of the reference position O of the movable region (strike zone 61). If the tilt data is a positive value, the X-axial coordinate value of the batting cursor is found by adding the value of Gh(x) to the X-axial coordinate value X0 of the reference position O of the strike zone. If the tilt data is a negative value, the X-axial coordinate value of the batting cursor is found by subtracting the value of Gh(x) from the X-axial coordinate value X0 of the reference position O of the strike zone.

It is possible to similarly calculate the displacement of the batting cursor from the center position of the strike zone to the Y-axial direction. For example, the function Gv(y) is expressed by the following equation:

$$Gv(y)=|Y3-Y0|\cdot\{\sin(|y|\cdot(\pi/2)-\pi/2)+1\} \quad\quad 5$$

Here, y is the y-axial direction tilt data. Y3 is the maximum value in the Y-axis of the movable region of the batting cursor, while Y0 is the Y-axial coordinate value of the reference position O of the movable region (strike zone 61). If the tilt data is a positive value, the Y-axial coordinate value of the batting cursor is found by adding the value of Gv(y) to the Y-axial coordinate value Y0 of the reference position O of the strike zone. If the tilt data is a negative value, the Y-axial coordinate value of the batting cursor is found by subtracting the value of Gv(y) from the Y-axial coordinate value Y0 of the reference position O of the strike zone.

Further, the position of the batting cursor can be corrected so that the position of the batting cursor approaches the arrival position of the ball around the strike zone 61. FIG. 8A and FIG. 8B are views for explaining the correction of the position of the batting cursor.

In FIG. 8A, the batting cursor 63 is displayed at the position P31 in the strike zone 61. Here, when the ball is pitched, the arrival position P4 of the ball is calculated. The arrival position P4 is determined by processing by the computer in accordance with the position of the cursor 62 determined in accordance with the operational input etc. of the user of the team in the field or the type of the pitch (straight, curve, screwball, etc.) For example, the position of the cursor 62 is used for determination of the direction of movement immediately after the ball 81 (FIG. 9) is pitched. Further, the type of the pitch is used for calculation of the trajectory of the ball 81.

Further, the position P32 corresponding to the state of the joystick is determined by calculation using the function Gh(x) and/or Gv(y). This being so, the corrected position P33 for making the position 32 approach the arrival position P4 of the ball is determined. The corrected position P33 is the position on the line segment connecting the position P32 and the arrival position 4 for example. Further, as shown in FIG. 8B, the batting cursor 63 is moved to the position P33.

Note that in the present embodiment, the position of the batting cursor is corrected only when the distance between the arrival position of the ball and the position of the batting cursor determined in accordance with the state of the joystick becomes less than a predetermined distance. The "predetermined distance" is for example the distance from the center position of the strike zone 61 to the maximum value in the Y-axial direction of the strike zone 61 (|Y1−Y0|).

Further, the correction amount α (α is a real number) when correcting the position of the batting cursor can for example be found by the following equation:

$$\alpha=\{1-D/(|Y1-Y0|)\}\cdot U \quad\quad 6$$

Here, D is a real number showing the distance between the arrival position of the ball and the position of the batting cursor determined in accordance with the state of the joystick (value before correction). U is a real number preset for showing the degree of correction. The larger the value of U, the larger the amount of correction per frame. Note that in the present embodiment, no correction is made when the correction amount α has become a negative value.

Further it is also possible to correct the position of the batting cursor only when the position of the batting cursor determined in accordance with the state of the joystick (value before correction) is updated to approach the arrival position of the ball. That is, the position of the batting cursor is corrected only when the joystick is operated by the user so that the batting cursor approaches the arrival position of the ball.

For this, the distance between the arrival position of the ball and the position of the batting cursor in the immediately preceding frame (value before correction) is stored. Further, the stored distance is compared with the distance between the arrival position of the ball and the position of the batting cursor in the present frame (position before correction). If the distance between the arrival position of the ball and the position of the batting cursor of the current frame (position before correction) is smaller, it is judged that the joystick is being operated so that the batting cursor approaches the arrival position of the ball.

By correcting the position of the batting cursor in this way, it becomes easier to finely adjust the position of the batting cursor toward the arrival position of the ball. Due to this correction, the possibility of hitting the ball rises. That is, it becomes easier to hit the ball.

Figure 9:
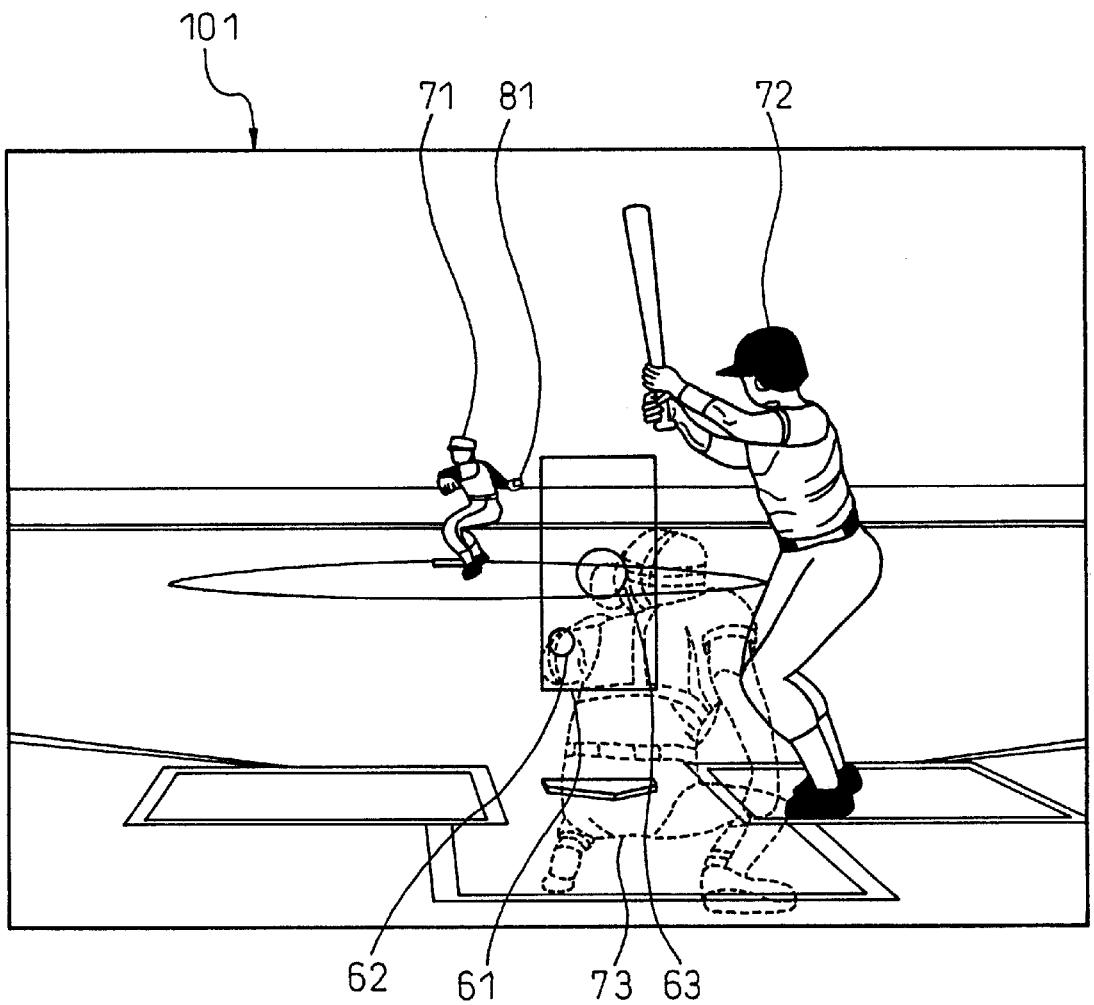
FIG. 9 is a first view of an example of the change of state of the display image in the case of displaying a game image from a perspective behind the catcher.
Figure 10:
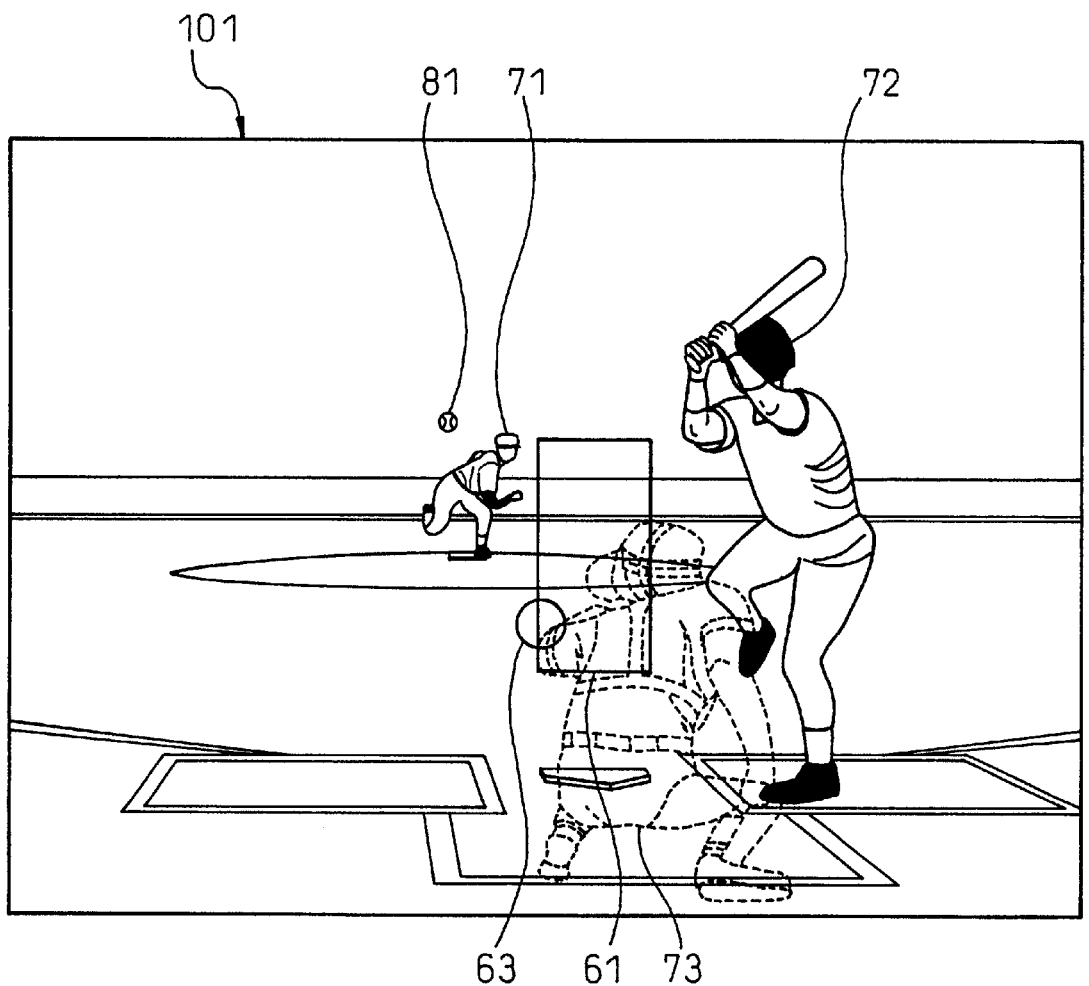
FIG. 10 is a second view of an example of the change of state of the display image in the case of displaying a game image from a perspective behind the catcher.
Figure 11:
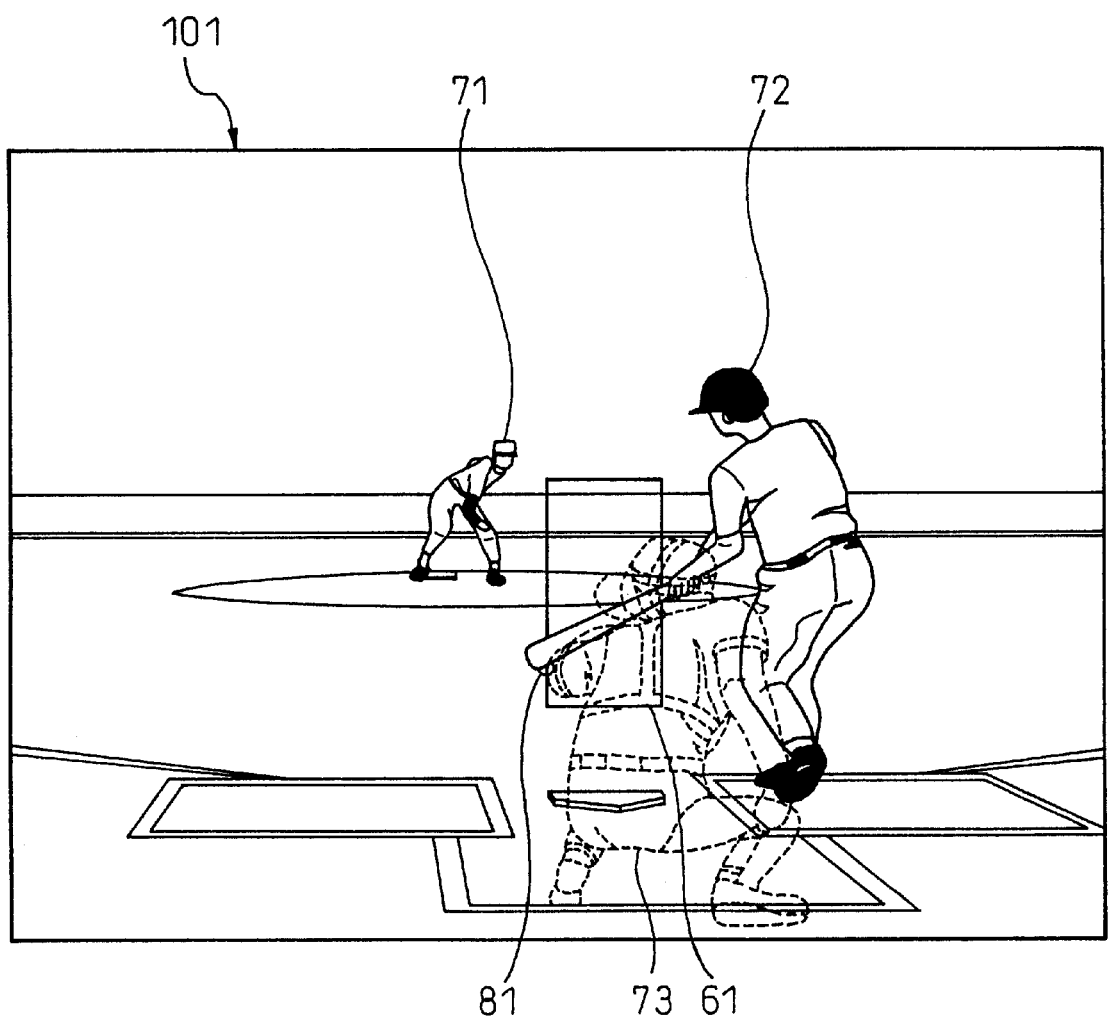
FIG. 11 is a third view of an example of the change of state of the display image in the case of displaying a game image from a perspective behind the catcher.

Next, an explanation will be given of the relationship between the change of state and operation according to the present embodiment. FIG. 9, FIG. 10, and FIG. 11 show an example of the change in state of an image at the time of pitching according to the present embodiment. Note that in the following example of the change of state, it is assumed that the user of the team in the field operates the keypad 50 and the user of the team at bat operates the keypad 51. The user operating the player of the team in the field can input an instruction to start a pitching action. For example, any of the buttons 50a, 50b, 50c, and 50d of the keypad 50 may be linked with the instruction for start of the pitching action. If the button linked with the instruction for the start of the pitching action is pressed by the user, the motion for the pitching by the pitcher is displayed on the screen.

First, FIG. 9 shows an example of the display screen after the pitcher starts the pitching action. In FIG. 9, three characters, that is, the pitcher 71, batter 72, and catcher 73, are displayed on the display screen 101. The catcher 73 is displayed semitransparently on the screen. The strike zone 61 is displayed behind the catcher 73. Further, the cursor 62 for designating the ball position and the batting cursor 63 showing the position of the bat swing are displayed in the strike zone 61. Further, in the state of FIG. 9, the pitcher 72 holds the ball 81.

Further, the cursor 62 can be made to move in the strike zone 61 or around the strike zone 61 by the user operating the joystick 50e. For example, if the user tilts the joystick 50e downward, the cursor 62 moves downward in the display screen 101. If the user tilts the joystick 50e upward, the cursor 62 moves upward in the display screen 101. If the user tilts the joystick 50e to the right, the cursor 62 moves to the right in the display screen 101. If the user tilts the joystick 50e to the left, the cursor 62 moves to the left in the display screen 101.

The cursor 62 is moved to the position determined in accordance with the state of the joystick 50e (tilt angle and tilt direction). Specifically, the target position of movement is determined in the plane including the strike zone 61 by the tilt angle and the tilt direction of the joystick 50e. The cursor 62 moves by a constant speed toward the target position of movement.

When motion for pitching by the pitcher 71 is started, the image of the catcher 73 which had been displayed opaquely is displayed semitransparently. When the image of the catcher 73 becomes semitransparent, the transparency gradually becomes higher from the opaque state. Further, in the example of FIG. 9, the cursor 62 moves to the bottom left in the strike zone 61. The cursor 62 can be made to move by the operation of the joystick 50e until the ball 81 leaves the hand of the pitcher.

The batting cursor 63 can be made to move in the strike zone 61 by the user of the team at bat operating the joystick 51e of the keypad 51. The user of the team at bat guesses the course over which the actual ball will be pitched from the position of the cursor 62 and makes the batting cursor 63 move toward that course. For example, if the user tilts the joystick 51e downward, the batting cursor 63 moves downward in the display screen 101. If the user tilts the joystick 51e upward, the batting cursor 63 moves upward in the display screen 101. If the user tilts the joystick 51e to the right, the batting cursor 63 moves to the right in the display screen 101. If the user tilts the joystick 51e to the left, the batting cursor 63 moves to the left in the display screen 101.

When the motion of the pitcher proceeds and the ball 81 leaves the hand of the pitcher, as shown in FIG. 10, the cursor 62 for designating the ball position (shown is in FIG. 9) disappears from the display screen 101. After the cursor 62 disappears from the screen, the user of the team at bat can predict the trajectory of the ball 81 by the successively changing position of the ball 81 and make the batting cursor 63 move to the predicted position when the ball 81 is pitched. In the example of FIG. 10, the batting cursor 63 is moved to the bottom left in the strike zone 61.

Note that it is also possible to display the cursor 62 for designating the ball position continuously even after the ball 81 leaves the hand of the pitcher. If the cursor 62 is continuously displayed, the user of the team at bat can make the batting cursor 63 move aiming at the position of the cursor 62. This makes it easier for the user of the team at bat to hit the ball 81.

When the ball 81 arrives around the strike zone 61, as shown in FIG. 11, the batting cursor 63 (shown in FIG. 10) disappears from the display screen 101. Further, when the batting is instructed by the user of the team at bat by operational input using the keypad 51, the swing motion of the batter 72 is displayed. The swing motion is motion whereby the bat held by the batter 72 passes through the position designated by the batting cursor 63.

By the user of the side in the field making the cursor 62 move in this way, it is possible to make the ball 81 be pitched to a position hard for the batter 72 to hit. In a general baseball game, the area near the center of the strike zone is set to be easy to hit, while the area near the boundary of the strike zone and its surroundings is set to be hard to hit. That is, by throwing the ball 81 near the surroundings of the strike zone 61, the possibility of the batter being struck out rises.

In the present invention, it is possible to finely adjust the position of the cursor 62 near the boundary of the strike zone 61 and its surroundings. Therefore, the user of the team in the field can make the ball be pitched over a course hard for the batter to hit. On the other hand, the user of the team at bat can finely adjust the position of the batting cursor near the center of the strike zone 61. Therefore, it can accurately hit back the ball 81 when the ball is pitched near the center of the strike zone 61.

Figure 12:
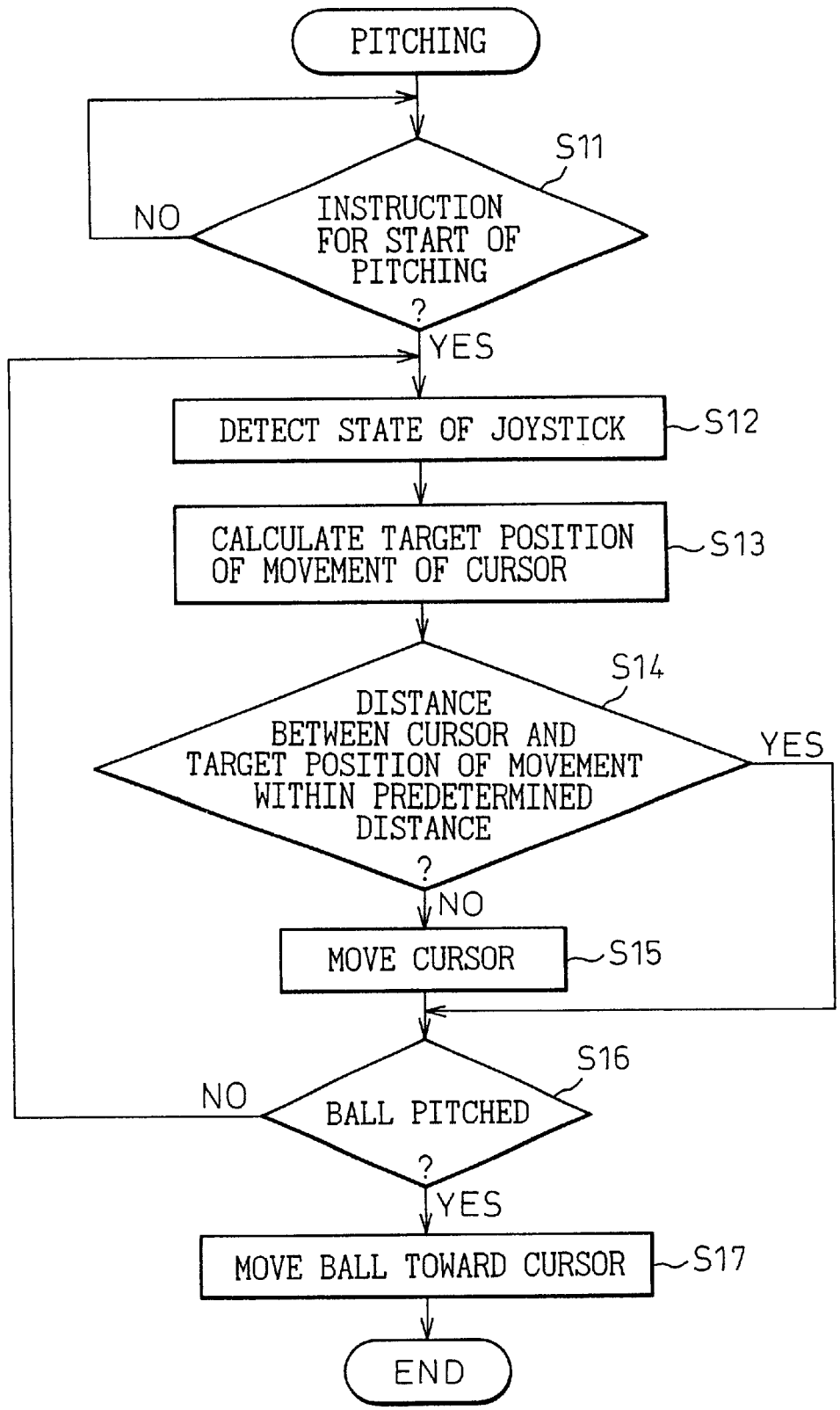
FIG. 12 is a flow chart of the routine of pitching processing, according to an embodiment of the present invention.

Next, an explanation will be made of the operation of the pitching processing according to the present embodiment. FIG. 12 is a flow chart explaining the pitching processing according to an embodiment of the present invention. The flow chart shows the processing in the case where the player of the team in the field is controlled by the user. Further, the flow chart shows processing from the state where the pitcher holds the ball.

First, it is judged if an instruction for start of the pitching has been input (step S11). The instruction for start of the pitching is input for example by operation of the buttons of the keypad determining the type of the pitch (straight, curve, etc.) or the joystick. If there is no instruction input for start of the pitching (step S11: NO route), the processing of step S11 is repeated until the instruction for the start of pitching is input.

When it is judged at step S11 that an instruction to start pitching was input (step S11: YES route), the state of the joystick operated by the user of the team in the field is detected (step S12). The "state of the joystick" is the tilt angle and tilt direction of the joystick. For example, the state of the joystick is expressed by the x-axial direction tilt data (−1 to +1) and the y-axial direction tilt data (−1 to +1).

The target position of movement of the cursor is calculated in accordance with the state of the joystick (step S13). The target position of movement is calculated for every frame by processing based on a function having the tilt data as a variable.

Next, the distance from the position of the cursor currently displayed and the target position of movement calculated at step S13 is found and whether the distance is within a predetermined distance is judged (step S14). Whether the distance between the cursor and the target position of movement is within the predetermined distance is judged for each display frame. When the distance between the cursor and the target position of movement is within a predetermined distance (step S14: YES route), the routine proceeds to step S16 without the processing of step S15.

When it is judged that the distance between the cursor and the target position of movement is not less than the predetermined distance (step S14: NO route), the cursor is moved by a predetermined speed to approach the target position of movement and the cursor is displayed at the moved position (step S15).

Next, it is judged if the ball has been pitched (step S16). Whether the ball has been pitched can be judged for example by detecting if the pitching motion of the pitcher has proceeded to the position where the ball is released. When the ball has not been pitched (step S16: NO route), the routine proceeds to step S12. Due to this, the control of movement of the cursor corresponding to the state of the joystick is repeated until the ball is pitched.

When the ball has been pitched (step S16: YES route), the movement of the ball is started toward the cursor (step S17). Note that in the present embodiment, the direction of movement of the ball when the ball is released from the hand of the pitcher is the direction designated by the position of the cursor, but when a curve ball is designated, the ball moves on a curved trajectory. Therefore, the ball does not necessarily pass through the position of the cursor. The processing for movement of the ball in the pitching processing ends at the point of time when the ball is hit by the batter or caught by the catcher. This ends the pitching processing as well.

By determining the target position of movement in accordance with the state of the joystick and making the cursor designating the ball gradually approach the target position of movement, the cursor can be controlled to smoothly move.

Figure 13:
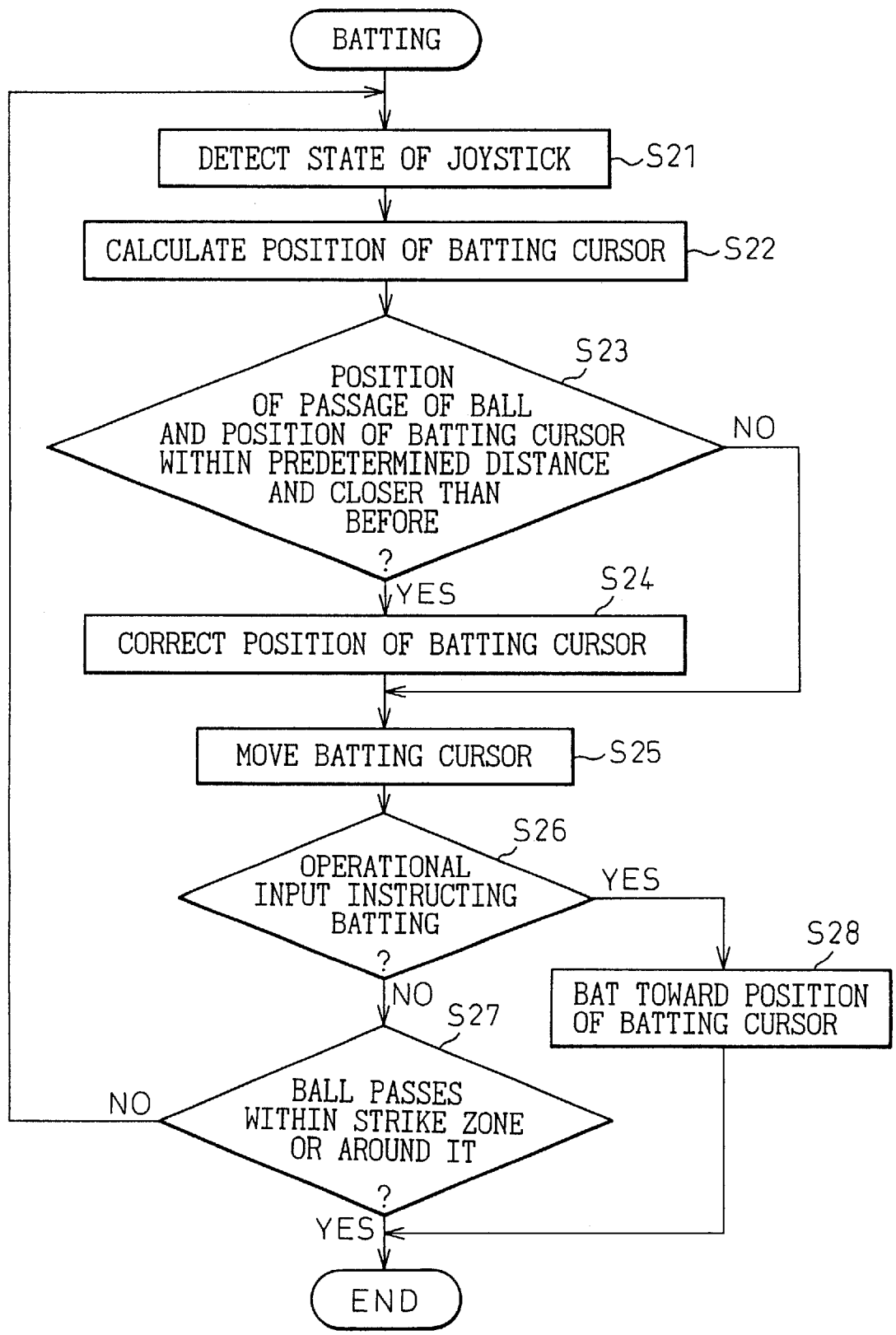
FIG. 13 is a flow chart of the routine of batting processing, according to an embodiment of the present invention.

Next, an explanation will be given of the operation of the batting processing according to the present embodiment. FIG. 13 is a flow chart for explaining the batting processing according to an embodiment of the present invention. The batting processing is started from the point of time when the pitching motion of the pitcher is started.

First, the state of the joystick operated by the user of the side at bat is detected (step S21). The "state of the joystick" is the tilt angle and tilt direction of the joystick. The state of the joystick is expressed by the x-axial direction tilt data (−1 to +1) and the y-axial direction tilt data (−1 to +1).

The position of the batting cursor is calculated in accordance with the state of the joystick (step S22). The position of the batting cursor can be calculated by processing based on a function having the tilt data as a variable.

It is judged if the distance between the position where the ball passes and the position of the batting cursor calculated at step S22 is within the predetermined distance and the position of the batting cursor is closer than the immediately previous position (step S23). When the distance between the position where the ball passes and the position of the batting cursor is not within the predetermined distance or if the position of the batting cursor is not closer than the position immediately before (step S23: NO route), the processing proceeds to step S25.

When the distance between the position where the ball passes and the position of the batting cursor calculated at step S22 is within the predetermined distance and the position of the batting cursor is closer than the immediately previous position (step S23: YES route), the position of the batting cursor is corrected (step S24). For example, the position of the batting cursor is corrected so that the position of the batting cursor approaches the position where the ball passes. In this case, the shorter the distance between the position where the ball passes and the position of the batting cursor, the larger the amount of correction of the position of the batting cursor can be made.

Next, batting cursor moved to the position calculated at step S22 or the position corrected at step S24 is displayed on the screen (step S25). Further, it is judged if an instruction for batting has been input from the keypad operated at the team at bat (step S26). When no instruction for batting has been input (step S26: NO route), it is judged if the ball has passed through the strike zone or its surroundings (step S27). For example, when the ball cuts across the plane including the strike zone, it can be judged that the ball has passed through the strike zone or its surroundings.

When the ball has passed through the strike zone or its surroundings (step S27: YES route), the batting processing ends. When the ball has not passed through the strike zone or its surroundings (step S27: NO route), the processing proceeds to step S21 where the processing for moving and displaying the batting cursor is continued.

Further, when it is judged that a batting instruction has been input (step S26: YES route), the batting processing is performed toward the position of the batting cursor (step S28). For example, motion of the batter by which the bat of the batter passes through the position of the batting cursor is displayed on the screen. The batting processing then ends.

As explained above, in the present embodiment, the speed of movement of the cursor near the boundary between the strike zone and its surroundings was made slower than the speed of movement in other regions. Due to this, fine adjustment of the ball position becomes easy near the boundary between the strike zone and its surroundings.

Further, in the present embodiment, the speed of movement of the batting cursor near the center position of the strike zone was made slower than the speed of movement in other regions. Due to this, fine adjustment of the batting position becomes easy near the center of the strike zone.

Further, in the present embodiment, the ball position is calculated using a function for designating the ball position and the batting position is calculated using a function separate from that function. Therefore, it is possible to use a function facilitating fine adjustment near the boundary between the strike zone and its surroundings for the ball position and possible to use a function facilitating fine adjustment near the center of the strike zone for the batting position. Due to this, it becomes possible for each user to designate the position using the joystick with a good operability.

Figure 14:
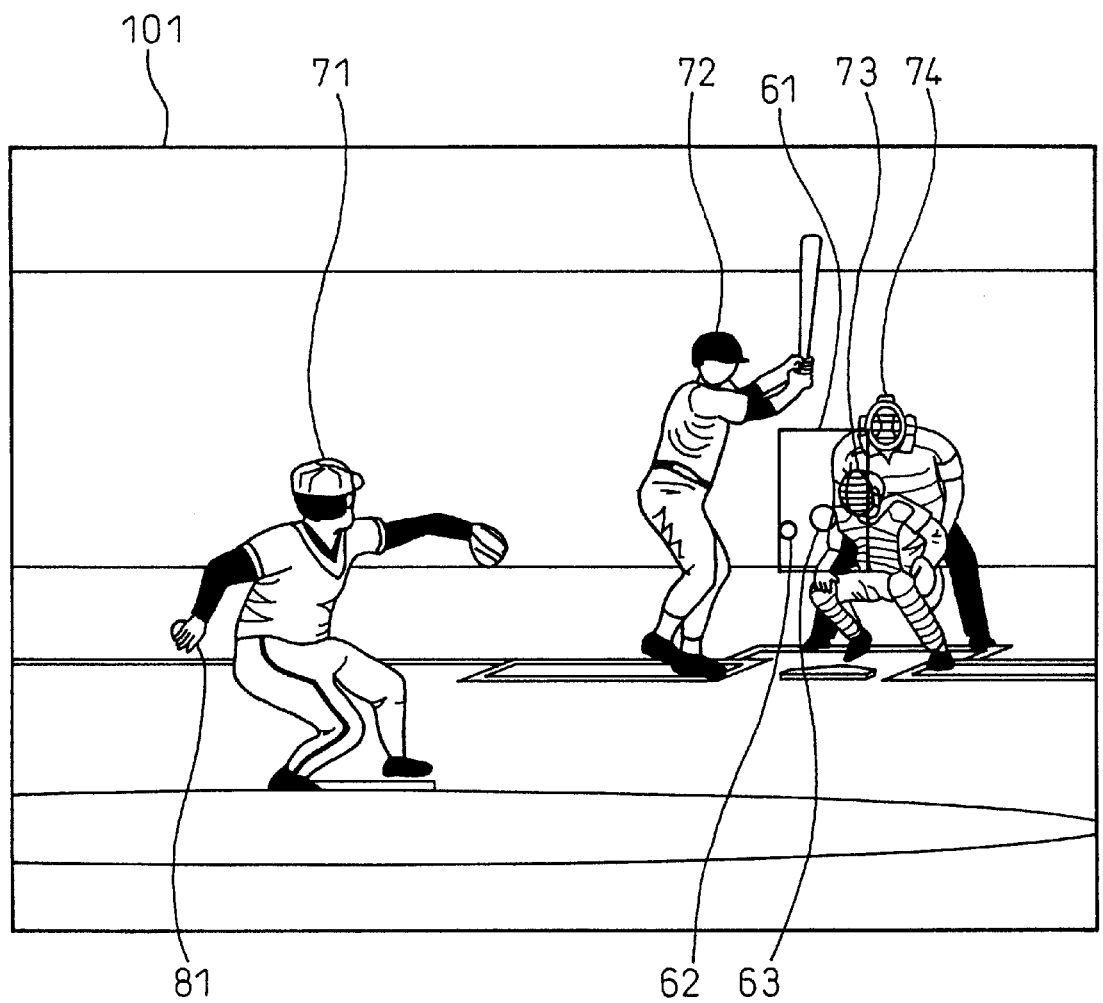
FIG. 14 is a first view of an example of the change of state of the display image in the case of displaying a game image from a perspective behind the pitcher.
Figure 15:
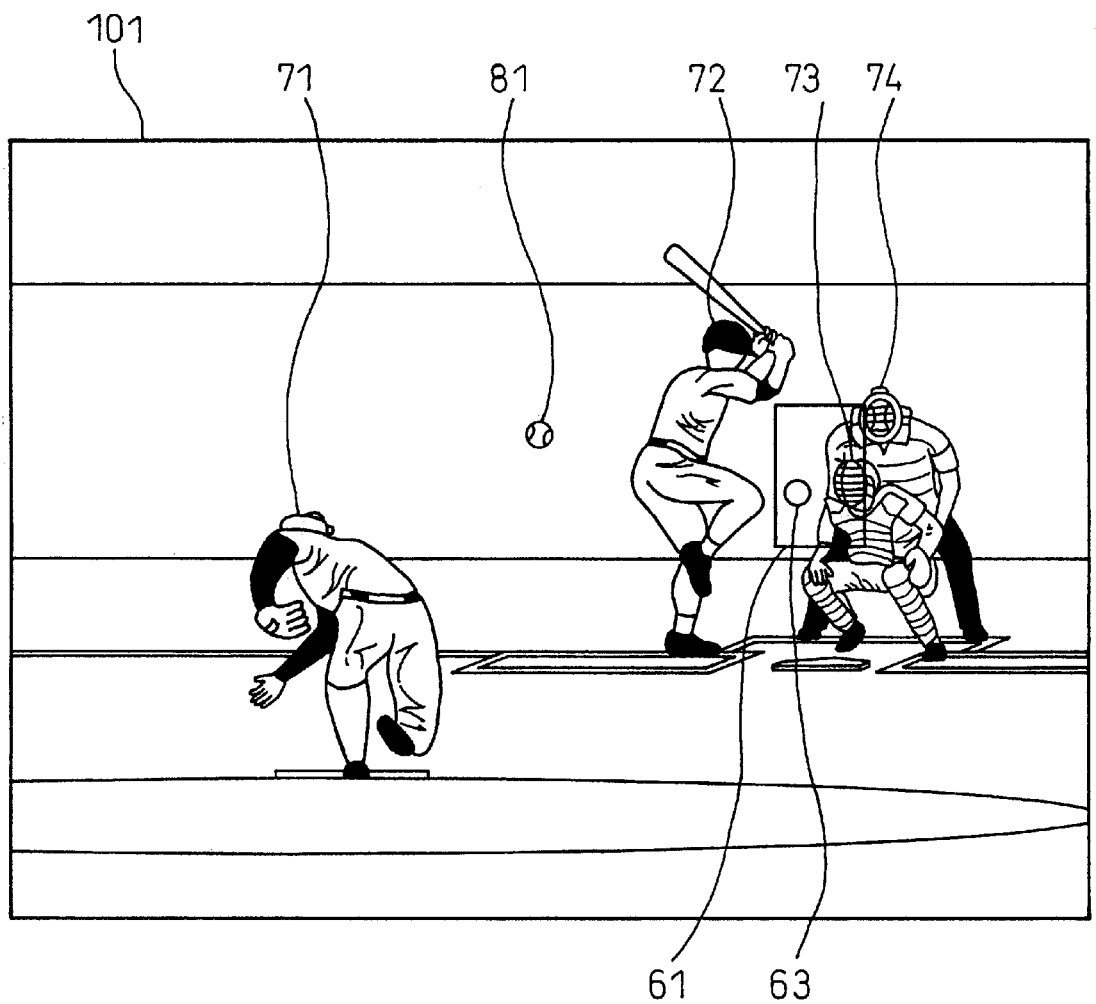
FIG. 15 is a second view of an example of the change of state of the display image in the case of displaying a game image from a perspective behind the pitcher.

Note that in the present embodiment, the explanation was made of an example of displaying an image from a perspective behind the catcher, but it is also possible to display the image from a perspective behind the pitcher. FIG. 14 and FIG. 15 show examples of the display screen from a perspective behind the pitcher.

The display image of FIG. 14 shows an example of the display image when drawing the scene shown in FIG. 9 from a perspective behind the pitcher. As shown in FIG. 14, if displaying the image on the screen from a perspective behind the pitcher 71, it is possible to display the batter 72, catcher 73, and umpire 74 from the front. By displaying the image on the screen from a perspective behind the pitcher, the strike zone 61, cursor 62, and batting cursor 63 are displayed in front of the catcher 73 or umpire 74. Due to this, the visibility when the user operates the joystick to make the cursor 62 or the batting cursor 63 move is improved.

Note that the display screen of FIG. 14 displays the strike zone 61 from a direction opposite to the display screen of FIG. 9. Therefore, for example, when the user of the team in the field tilts the joystick to the left side, in the example of FIG. 9, the cursor moves in the direction away from the batter 72, but in the example of FIG. 14, the cursor moves in the direction approaching the batter 72.

When the ball 81 leaves the hand of the pitcher from the state of FIG. 14, as shown in FIG. 15, the cursor 62 is erased from the display. Note that until the ball 81 passes through the area around the strike zone 61, the user of the team at bat can use the joystick to move the batting cursor 63 and designate the batting position.

By displaying the image from a perspective behind the pitcher in this way, the strike zone 61, cursor 62, and batting zone 63 becomes more visible and control by the user is facilitated.

Further, it is also possible to simultaneously display images on the screen from a plurality of perspectives. FIG. 16 shows an example of the display in the case of simultaneously displaying an image from a perspective behind the batter and an image from a perspective behind the pitcher on the screen simultaneously. In FIG. 16, the image from the perspective behind the batter is displayed at the left side of the display screen 101. Further, the image from the perspective behind the pitcher is displayed at the right side of the display screen 101.

In the image from the perspective behind the batter, the pitcher 71a, batter 72a, catcher 73a, strike zone 61a, cursor 62a, batting cursor 63a, and ball 81a are displayed. The catcher 73a in the image from the perspective behind the batter is displayed semitransparently. In the image from the perspective behind the pitcher, the pitcher 71b, batter 72b, catcher 73b, umpire 74b, strike zone 61b, cursor 62b, batting cursor 63b, and ball 81b are displayed.

Since images from a plurality of perspectives are simultaneously displayed, even when two users are playing against each other, it is possible to play the game from a perspective at the back of the players controlled by the users (pitcher or batter). As a result, it is possible for each user to view an image from a perspective facilitating control and improve the operability of the game.

That is, since the cursor position is made to move on the two-dimensional plane by processing by functions based on sines with respect to the X-axial direction and Y-axial direction, it is possible to realize fine cursor movement in accordance with tilt of the control device. Due to this, when moving the cursor in the strike zone and batting zone, it is possible to improve the accuracy of the cursor display position and the operability.

Due to the above, it is possible to control the ball position with respect to a pitcher's best pitch near the boundary between the strike zone and outside the zone. That is, it enables fine adjustment of the ball position and realizes fine control to the desired ball position.

On the other hand, in the batting zone, since the general practice is for the batter to swing at the center portion of the zone rather than swing aiming near the boundary between the zone and outside the zone, it is desirable for the user controlling the batter to be able to finely adjust the batting position at the center portion of the batting zone. Therefore, the above embodiment enables fine adjustment of the batting position and enables realization of fine control to the desired batting position.

In the above embodiment, the example was given of a baseball game as a ball-playing type game, but the present invention is not limited to this. It may be applied to any ball-playing game having scenes where a joystick or other control device is used to designate a position in a predetermined region such as soccer, basketball, American football, tennis, and ice hockey.

Further, the present invention can be applied to any of a specialized game machine, arcade machine, personal computer, portable information terminal, mobile phone, etc.

In the above embodiment, the program for realizing the embodiment of the present invention was stored in a CD-ROM or hard disk, but the present invention is not limited to this. It is also possible to store it on a magneto optical disk (MO), DVD, or other computer readable program product. Further, when downloading the above program on to a hard disk, it is possible to use a commercial network, the Internet, Intranet, Extranet, etc. for the network 111.

Summarizing the effects of the invention, according to the present invention, it is possible to obtain a computer readable program product storing a program for processing of a cursor display of a ball-playing type game which moves a cursor on a two-dimensional plane by two intersecting functions to enable realization of fine cursor movement in accordance with the tilt of a control device and thereby enables improvement of the accuracy and operability of the cursor display position, such a program, and a cursor display processor and method of a ball-playing type game.

While the invention has been described by reference to specific embodiments chosen for purposes of illustration, it should be apparent that numerous modifications could be made thereto by those skilled in the art without departing from the basic concept and scope of the invention.

What is claimed is:

1. A computer readable program product storing a program for processing of a cursor display in a ball-playing type game, said program product storing a program for making a computer:
receive as input tilt data output in accordance with operation by a user using a control device outputting tilt data expressing a tilt angle and tilt direction,
calculate coordinate data based on the input tilt data using a first function linked with a first axial direction and a second function different from the first function and linked with a second axial direction for two intersecting axes when converting the input tilt data to two-dimensional coordinates, and
process movement of the cursor display based on the calculated coordinate data.

2. The program product as set forth in claim 1, wherein said program further makes said computer reduce the amount of movement of the cursor display with respect to an amount of operation of said control device the closer the tilt angle of the control device gets to the limit of tilt of said control device by using the first and second functions.

3. The program product as set forth in claim 1, wherein the range of movement of the cursor display is within a rectangular shape including a strike zone.

4. The program product as set forth in claim 1, wherein said first and second functions are functions expressing curves having tilt data as variables.

5. The program product as set forth in claim 4, wherein said first and second functions include sine.

6. The program product as set forth in claim 1, wherein said program further makes said computer increase the amount of movement of the cursor display with respect to an amount of operation of said control device the closer the tilt angle of the control device gets to the limit of tilt of said control device by using the first and second functions.

7. The program product as set forth in claim 1, wherein the range of movement of the cursor display is within a rectangular shape forming a batting zone.

8. The program product as set forth in claim 7, wherein said first and second functions are functions expressing curves having tilt data as variables.

9. The program product as set forth in claim 8, wherein said first and second functions includes a sine.

10. The program product as set forth in claim 7, wherein said program further makes said computer correct a cursor display position so as to track a position of passage of a ball determined at the pitching in said batting zone when making said cursor display move.

11. A program for processing a cursor display of a ball-playing type game,
said program making a computer:
receive as input tilt data output in accordance with operation by a user using a control device outputting tilt data expressing a tilt angle and tilt direction,
calculate coordinate data based on said input tilt data using a first function linked with a first axial direction and a second function, different from the first function, and linked with a second axial direction for two intersecting axes when converting said input tilt data to two-dimensional coordinates, and
process movement of the cursor display based on said calculated coordinate data.

12. The program as set forth in claim 11, further making said computer reduce the amount of movement of the cursor display with respect to an amount of operation of said control device the closer the tilt angle of the control device gets to the limit of tilt of said control device by using the first and second functions.

13. The program as set forth in claim 11, wherein the range of movement of the cursor display is within a rectangular shape including a strike zone.

14. The program as set forth in claim 11, wherein said first and second functions are functions expressing curves having tilt data as variables.

15. The program as set forth in claim 14, wherein said first and second functions includes a sine.

16. The program as set forth in claim 11, further making said computer increase the amount of movement of the cursor display with respect to an amount of operation of said control device the closer the tilt angle of the control device gets to the limit of tilt of said control device by using the first and second functions.

17. The program as set forth in claim 11, wherein the range of movement of the cursor display is within a rectangular shape forming a batting zone.

18. The program as set forth in claim 17, wherein said first and second functions are functions expressing curves having tilt data as variables.

19. The program as set forth in claim 18, wherein said first and second functions includes a sine.

20. The program as set forth in claim 17, further making said computer correct a cursor display position so as to track a position of passage of a ball determined at the pitching in said batting zone when making said cursor display move.

21. A cursor display processor for a ball-playing type game comprising:
a computer readable program product storing a program for processing of a cursor display of a ball-playing type game,
a computer for reading and executing at least part of the program from said program product, and
a display for displaying the ball-playing type game realized by said computer, said computer
receive as input tilt data output in accordance with operation by a user using a control device outputting tilt data expressing a tilt angle and tilt direction,
calculate coordinate data based on said input tilt data using a first function linked with a first axial direction and a second function, different from the first function, and linked with a second axial direction for two intersecting axes when converting said input tilt data to two-dimensional coordinates, and
display movement of the cursor display on the display based on said calculated coordinate data.

22. The cursor display processor for a ball-playing type game as set forth in claim 21, further making said computer reduce the amount of movement of the cursor display with respect to an amount of operation of said control device the closer the tilt angle of the control device gets to the limit of tilt of said control device by using the first and second functions.

23. The cursor display processor for a ball-playing type game as set forth in claim 21, wherein the range of movement of the cursor display is within a rectangular shape including a strike zone.

24. The cursor display processor for a ball-playing type game as set forth in claim 21, wherein said first and second functions are functions expressing curves having tilt data as variables.

25. The cursor display processor for a ball-playing type game as set forth in claim 24, wherein said first and second functions includes a sine.

26. The cursor display processor for a ball-playing type game as set forth in claim 21, further making said computer increase the amount of movement of the cursor display with respect to an amount of operation of said control device the closer the tilt angle of the control device gets to the limit of tilt of said control device by using the first and second functions.

27. The cursor display processor for a ball-playing type game as set forth in claim 21, wherein the range of movement of the cursor display is within a rectangular shape forming a batting zone.

28. The cursor display processor for a ball-playing type game as set forth in claim 27, wherein said first and second functions are functions expressing curves having tilt data as variables.

29. The cursor display processor for a ball-playing type game as set forth in claim 28, wherein said first and second functions includes a sine.

30. The cursor display processor for a ball-playing type game as set forth in claim 27, further making said computer correct a cursor display position so as to track a position of passage of a ball determined at the pitching in said batting zone when making said cursor display move.

31. A cursor display processing method for a ball-playing type game for processing of a cursor display of a ball-playing type game, comprising:

receiving as input tilt data output in accordance with operation by a user using a control device outputting tilt data expressing a tilt angle and tilt direction, calculating coordinate data based on said input tilt data using a first function linked with a first axial direction and a second function, different from the first function, and linked with a second axial direction for two intersecting axes when converting said input tilt data to two-dimensional coordinates, and processing movement of the cursor display on the display based on said calculated coordinate data.

32. The cursor display processing method for a ball-playing type game as set forth in claim 31, further reducing the amount of movement of the cursor display with respect to an amount of operation of said control device the closer the tilt angle of the control device gets to the limit of tilt of said control device by using the first and second functions.

33. The cursor display processing method for a ball-playing type game as set forth in claim 31, wherein the range of movement of the cursor display is within a rectangular shape including a strike zone.

34. The cursor display processing method for a ball-playing type game as set forth in claim 31, wherein said first and second functions are functions expressing curves having tilt data as variables.

35. The cursor display processing method for a ball-playing type game as set forth in claim 34, wherein said first and second functions includes a sine.

36. The cursor display processing method for a ball-playing type game as set forth in claim 31, further increasing the amount of movement of the cursor display with respect to an amount of operation of said control device the closer the tilt angle of the control device gets to the limit of tilt of said control device by using the first and second functions.

37. The cursor display processing method for a ball-playing type game as set forth in claim 31, wherein the range of movement of the cursor display is within a rectangular shape forming a batting zone.

38. The cursor display processing method for a ball-playing type game as set forth in claim 37, wherein said first and second functions are functions expressing curves having tilt data as variables.

39. The cursor display processing method for a ball-playing type game as set forth in claim 38, wherein said first and second functions includes a sine.

40. The cursor display processing method for a ball-playing type game as set forth in claim 37, further correcting a cursor display position so as to track a position of passage of a ball determined at the pitching in said batting zone when making said cursor display move.

* * * * *

UNITED STATES PATENT AND TRADEMARK OFFICE
CERTIFICATE OF CORRECTION

PATENT NO. : 6,257,983 B1
DATED : July 10, 2001
INVENTOR(S) : S. Rimoto

It is certified that error appears in the above-identified patent and that said Letters Patent is hereby corrected as shown below:

<u>Title page,</u>
Item [54], Title, line 6, after "BALL-PLAYING" delete "TYPE".

Signed and Sealed this

Twenty-sixth Day of March, 2002

*Attest:*

*Attesting Officer*

JAMES E. ROGAN
*Director of the United States Patent and Trademark Office*